US 12,082,515 B2

(12) United States Patent
Jones

(10) Patent No.: US 12,082,515 B2
(45) Date of Patent: Sep. 10, 2024

(54) METHODS FOR CONTROLLING ARTICULATING TONGUE ARRANGEMENTS UTILIZED IN TOWING AGRICULTURAL IMPLEMENTS

(71) Applicant: Deere & Company, Moline, IL (US)

(72) Inventor: Austin J. Jones, Ottumwa, IA (US)

(73) Assignee: DEERE & COMPANY, Moline, IL (US)

( * ) Notice: Subject to any disclaimer, the term of this patent is extended or adjusted under 35 U.S.C. 154(b) by 823 days.

(21) Appl. No.: 17/199,857

(22) Filed: Mar. 12, 2021

(65) Prior Publication Data

US 2022/0287240 A1  Sep. 15, 2022

(51) Int. Cl.
*A01B 59/042* (2006.01)
*A01B 59/00* (2006.01)
(Continued)

(52) U.S. Cl.
CPC .......... *A01B 59/042* (2013.01); *A01B 59/004* (2013.01); *A01B 69/003* (2013.01);
(Continued)

(58) Field of Classification Search
CPC ..... B30B 9/3007; B30B 9/3014; B60D 1/155; B60D 1/187; B60D 1/24; B60D 2001/008;
(Continued)

(56) References Cited

U.S. PATENT DOCUMENTS 3,167,327 A   1/1965 Bumpious
4,433,533 A * 2/1984 Giani .................. A01B 69/003
                                                   56/341

(Continued)

FOREIGN PATENT DOCUMENTS

DE    3301984 A1    7/1984
DE    4019948 A1    1/1991
(Continued)

OTHER PUBLICATIONS

United States Office Action, U.S. Appl. No. 17/199,813, Oct. 30, 2023, 28 pages.
(Continued)

*Primary Examiner* — Arpad Fabian-Kovacs
(74) *Attorney, Agent, or Firm* — KLINTWORTH & ROZENBLAT IP LLP

(57) ABSTRACT

A method is carried-out by a controller architecture coupled to a beam assembly actuator, which is included in an articulating tongue arrangement connecting an agricultural implement to a tow vehicle. In an embodiment, the method includes: (i) monitoring, via the controller architecture, an effective tow length of an articulating beam assembly further included in the articulating tongue arrangement, the effective tow length measured along a straight line extending from a leading pivot joint of the articulating tongue arrangement to a trailing pivot joint of the articulating tongue arrangement; (ii) determining, at the controller architecture, an effective tow length target of the articulating tongue arrangement based upon operator input, sensor input, or a combination thereof; and (iii) transmitting commands from the controller architecture to the beam assembly actuator to maintain the effective tow length of the articulating beam assembly in conformance with the effective tow length target.

20 Claims, 12 Drawing Sheets

(51) Int. Cl.
*A01B 69/00* (2006.01)
*B30B 9/30* (2006.01)
*B60D 1/155* (2006.01)
*B60D 1/18* (2006.01)
*B62D 13/00* (2006.01)
*A01B 59/041* (2006.01)
*A01B 63/32* (2006.01)
*A01B 69/04* (2006.01)
*A01F 15/08* (2006.01)
*A01F 15/10* (2006.01)
*B60D 1/00* (2006.01)
*B60D 1/24* (2006.01)

(52) U.S. Cl.
CPC ............ *B30B 9/3007* (2013.01); *B60D 1/155* (2013.01); *B60D 1/187* (2013.01); *B62D 13/00* (2013.01); *A01B 59/041* (2013.01); *A01B 63/32* (2013.01); *A01B 69/008* (2013.01); *A01F 15/0833* (2013.01); *A01F 15/085* (2013.01); *A01F 15/0883* (2013.01); *A01F 15/106* (2013.01); *B30B 9/3014* (2013.01); *B60D 2001/008* (2013.01); *B60D 1/24* (2013.01)

(58) Field of Classification Search
CPC ..... B62D 13/00; A01B 59/004; A01B 59/041; A01B 59/042; A01B 63/32; A01B 69/003; A01B 69/008; A01F 15/0833; A01F 15/085; A01F 15/0883; A01F 15/106

See application file for complete search history.

(56) References Cited

U.S. PATENT DOCUMENTS

| | | | | |
|---|---|---|---|---|
| 4,662,646 | A * | 5/1987 | Schlapman | A01D 67/005 172/679 |
| 6,000,206 | A * | 12/1999 | Case | A01F 15/04 100/88 |
| 9,232,688 | B2 * | 1/2016 | Kormann | A01B 69/005 |
| 9,706,697 | B2 * | 7/2017 | Wilkening | A01B 69/004 |
| 2003/0140610 | A1 | 7/2003 | Boyko | |
| 2004/0070172 | A1 * | 4/2004 | Colistro | A01D 67/005 280/472 |
| 2017/0118918 | A1 | 5/2017 | Chaney et al. | |
| 2017/0188505 | A1 * | 7/2017 | Potier | B62D 13/00 |
| 2017/0245417 | A1 | 8/2017 | Frascella | |
| 2017/0251588 | A1 | 9/2017 | Sporrer et al. | |
| 2018/0202804 | A1 * | 7/2018 | Dumble | G01B 21/16 |
| 2018/0211450 | A1 | 7/2018 | Gresch | |
| 2018/0325013 | A1 | 11/2018 | Boydens et al. | |
| 2019/0133044 | A1 | 5/2019 | Thompson et al. | |
| 2020/0247196 | A1 * | 8/2020 | Guiet | B60K 25/00 |
| 2022/0287215 | A1 * | 9/2022 | Jones | A01B 59/004 |

FOREIGN PATENT DOCUMENTS

| | | | | |
|---|---|---|---|---|
| DE | 19635958 | A1 | | 4/1997 |
| DE | 19919323 | A1 | | 11/2000 |
| DE | 102012100699 | A1 | | 8/2013 |
| EP | 1097628 | A1 * | 5/2001 | ........... A01B 69/003 |
| EP | 2621257 | A1 | | 8/2013 |
| EP | 3400768 | A1 * | 11/2018 | ............. A01B 69/00 |
| EP | 3837961 | A1 * | 6/2021 | ........... A01B 69/004 |
| EP | 3781458 | B1 * | 8/2023 | ............. B62D 13/00 |
| FR | 2904182 | A1 | | 2/2008 |
| FR | 2998517 | A1 * | 5/2014 | ........... A01D 34/661 |
| WO | WO-2013175097 | A1 * | 11/2013 | ............. A01B 71/06 |
| WO | WO-2016059008 | A1 * | 4/2016 | ........... A01B 59/043 |
| WO | 2017201471 | A1 | | 11/2017 |
| WO | WO-2018206678 | A1 * | 11/2018 | ........... A01B 69/001 |

OTHER PUBLICATIONS

John Deere, Balers, Zero Series Round Balers • Plus2™ Round Baler Accumulators • Small Square Balers • V451R & V461R Series Round Balers Brochure, Jul. 2018. (40 pages).

John Deere, Mower-Conditioners and Mowers Brochure, Nov. 2016. (24 pages).

Extended European Search Report and Written Opinion issued in European Patent Application No. 22158684.5, dated Aug. 4, 2022, in 09 pages.

Extended European Search Report and Written Opinion issued in European Patent Application No. 22158685.2, dated Aug. 5, 2022, in 05 pages.

* cited by examiner

METHODS FOR CONTROLLING ARTICULATING TONGUE ARRANGEMENTS UTILIZED IN TOWING AGRICULTURAL IMPLEMENTS

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates to articulating tongue arrangements utilized in towing agricultural implements, such as balers and mower-conditioners, behind tractors and other tow vehicles.

BACKGROUND OF THE DISCLOSURE

Agricultural implements are towed behind tractors to perform field tillage and cultivation, seeding, chemical treatment, crop harvesting, baling, and similar tasks. Examples of towed agricultural implements include mechanical planters, air seeders, tillage implements, mower-conditioners, fertilizer application equipment, and hay and forage baling equipment, such as round and square balers. A towed agricultural implement is typically connected to a tractor utilizing a tongue arrangement, which interfaces with a (e.g., 3-point) hitch provided at the tractor rear. Mechanical power may be supplied to the agricultural implement via a splined Power Takeoff (PTO) shaft, which is accessible from the tractor's rear end and which is linked to an input shaft of the implement through a driveline included in the tongue arrangement. In certain cases, a tractor may also drive electrical, hydraulic, or pneumatic functions of an agricultural implement through corresponding electrical and/or flow line connections, which span the tongue arrangement. In a majority of tow arrangements, an agricultural implement is positioned in an in-line tow configuration; that is, such that the implement is pulled directly behind the tractor and aligns with the tractor when traveling a straight path. However, a limited number of implements, predominately mower-conditions, are towed utilizing a side-pull tongue arrangement, which maintains the implement in a laterally-offset position to one side of a tractor during towing; or utilizing a center-pivot tongue arrangement, which enables the implement to swing to either side of the tractor during towing, whether freely or under hydraulic cylinder control.

SUMMARY OF THE DISCLOSURE

In a first example embodiment, a method is carried-out by a controller architecture coupled to a beam assembly actuator, which is included in an articulating tongue arrangement connecting an agricultural implement to a tow vehicle. The method includes the steps or processes of: (i) monitoring, via the controller architecture, an effective tow length of an articulating beam assembly further included in the articulating tongue arrangement, the effective tow length measured along a straight line extending from a leading pivot joint of the articulating tongue arrangement to a trailing pivot joint of the articulating tongue arrangement; (ii) determining, at the controller architecture, an effective tow length target of the articulating tongue arrangement based upon operator input, sensor input, or a combination thereof; and (iii) transmitting commands from the controller architecture to the beam assembly actuator to maintain the effective tow length of the articulating beam assembly in conformance with the effective tow length target.

14. In further embodiments, a method is carried-out by a controller architecture coupled to a beam assembly actuator included in an articulating tongue arrangement connecting a tow vehicle to a round baler having a baling compartment. The method includes the steps or processes of: (i) monitoring when the round baler is preparing to eject a round bale from the baling compartment; and (ii) when the round baler is preparing to eject a round bale, controlling the articulating tongue arrangement to move the round baler in a forward direction and urge ejection of the round bale from the baling compartment. The step of controlling further includes the sub-steps or subprocesses of: (ii)(a) determining, via the controller architecture, commands for transmission to the beam assembly actuator to adjust an effective tow length of an articulating beam assembly further included in the articulating tongue arrangement; and (ii)(b) transmitting the commands from the controller architecture to the beam assembly actuator to adjust the effective tow length of the articulating beam assembly and move the round baler in a forward direction in conjunction with ejection of the round bale from the baling compartment.

In still further embodiments, a method is carried-out by a controller architecture coupled to a beam assembly actuator included in an articulating tongue arrangement connecting an agricultural implement to a tow vehicle. The articulating tongue arrangement further includes an articulating beam assembly having an effective tow length adjustable utilizing the beam assembly actuator. The method includes the steps or processes of: (i) monitoring, at the controller architecture, a variable feedrate at which the agricultural implement intakes crop material when towed behind the tow vehicle; (ii) determining, via the controller architecture, when a temporary feedrate modification to the variable feedrate of the agricultural implement is warranted; and (iii) when determining that a temporary feedrate modification to the variable feedrate is warranted, transmitting commands from the controller architecture to the beam assembly actuator to adjust the effective tow length of the articulating beam assembly to provide the temporary feedrate modification.

The details of one or more embodiments are set-forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures.

Figure 1:
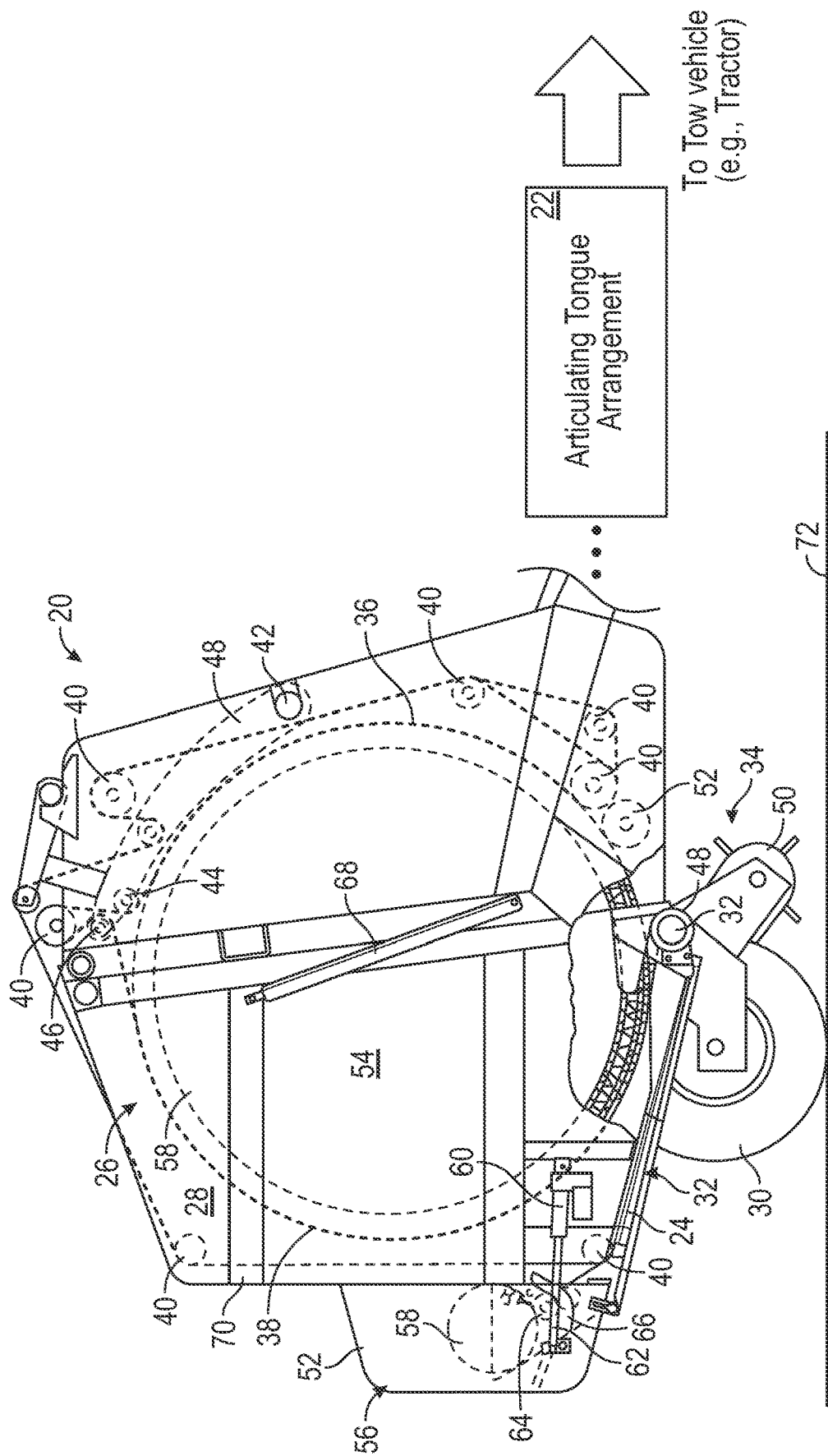
FIG. 1 is a simplified cross-sectional view of a towed agricultural implement (here, a round baler) connectable to a tractor or other tow vehicle via an embodiment of the presently-disclosed articulating tongue arrangement.

Like reference symbols in the various drawings indicate like elements. For simplicity and clarity of illustration, descriptions and details of well-known features and techniques may be omitted to avoid unnecessarily obscuring the example and non-limiting embodiments of the invention described in the subsequent Detailed Description. It should further be understood that features or elements appearing in the accompanying figures are not necessarily drawn to scale unless otherwise stated.

DETAILED DESCRIPTION

Embodiments of the present disclosure are shown in the accompanying figures of the drawings described briefly above. Various modifications to the example embodiments may be contemplated by one of skill in the art without departing from the scope of the present invention, as set-forth the appended claims.

As appearing herein, the term "pivoting joint" refers to a mechanical joint enabling pivoting or swiveling motion between mechanically connected structural components or elements. A pivoting joint may restrict relative movement between the coupled structural components exclusively to pivoting motions, as in the case of a pin or hinge joint; or may instead further permit relative movement between named structural components in additional degrees of freedom (DOFs), as in the case of a spherical or ball-in-socket joint. In the context of the below-described articulating tongue arrangements, specifically, a pivoting joint enabling both pivoting motion and other movement in one or more additional DOFs may be incorporated into the tongue arrangement at one or more locations to, for example, permit movement of a towed agricultural implement relative to a tow vehicle about pitch and roll axes.

Overview

As indicated above, conventional tongue arrangements typically provide a rigid, fixed-length connection between a towed agricultural implement and a tow vehicle, such as a tractor. Additionally, conventional tongue arrangements often maintain a towed agricultural implement in a fixed, in-line tow position such that the agricultural implement aligns axially with the tractor when traveling a straight path. As an exception to this general statement, center-pivot tongue arrangements are known for usage in conjunction with mower-conditioners, which enable a mower-conditioner to swivel between side-pull positions offset to the left or right side of a tractor. While providing additional maneuverability relative to non-pivoting side-pull tongue arrangements, center-pivot tongue arrangements offer only limited improvements in freedom of movement of an agricultural implement (here, a mower-conditioner) relative to a tractor. Further, to enable positioning of a mower-conditioner fully to a given side of a tractor (such that the mower-conditioner remains unobstructed by the tractor when viewed from a "head-on" viewpoint), the rigid central section of a conventional center-pivot tongue arrangement is often required to possess a considerable length, which can approach or exceed 30 feet (approximately 10 meters) in many instances. Such a lengthy tow connection adds undesired bulk to the tongue arrangement and may become unwieldy or cumbersome when, for example, transporting the mower-conditioner behind a tractor on public roadways. More generally, such center-pivot tongue arrangements may be poorly suited for usage in towing other types of agricultural implements aside from mower-conditioners including, for example, round and square balers.

Further challenges arise when pulling round balers, specifically. For example, effectively piloting a tractor (or other tow vehicle) when pulling a round baler during bale formation and ejection can be a demanding task. Often, an operator is required to consistently monitor windrow shape, size, and location relative to the tractor and the round baler, while adjusting tractor speed and position relative to the baler and the surrounding environment. Proper bale formation (that is, forming crop bales to a desired size and shape) may require relative frequent acceleration and deceleration (if not abrupt stopping) of the tractor, noting that it is common for a tractor and round baler to undergo appreciable weaving during bale formation. Additional challenges are also encountered when ejecting round bales (e.g., cylinder square shouldered bales) in sloped or undulating terrain, referred to herein more briefly as "hills." To prevent downhill rolling of such bales when ejected in hills, an operator may further be required to position the baler such that a round bale generally aligns with the local slope of the terrain, as taken along the length of the crop bale. This may require navigating the baler, the tongue arrangement, and the tractor into an L-shaped jackknife position as the tractor travels upwardly or downwardly to traverse a hill during the final stages of bale formation and subsequent bale ejection. While skilled operators may perform the tasks mentioned above with a fair degree of efficiency, existing tongue arrangements do little to assist with such tasks or to ease the mental workload placed on operators when pulling round balers under challenging or adverse conditions.

There thus exists an ongoing industrial demand for improved tongue arrangements providing enhanced maneuverability during towed implement usage, increasingly compact designs (particularly during roadway transport), and other enhanced features or functions relative to existing tongue arrangements traditionally utilized in towing agricultural implements. Ideally, such improved tongue arrangements would be well-suited for usage in towing multiple types of agricultural implements including, but not limited to, mower-conditioners and round balers. In satisfaction of these and other ongoing industrial needs, the following discloses articulating tongue arrangements having unique structural designs, which enable controlled variations in the effective tow length of the tongue arrangement during usage. As appearing herein, the term "effective tow length" refers to a dimension of the articulating tongue arrangement measured along a straight line, which extends from a leading pivoting joint of the tongue arrangement to a trailing pivoting joint of the tongue arrangement. The leading pivoting joint is provided between a vehicle attachment section of the tongue arrangement and a leading end portion of an articulating beam assembly, which is further included the tongue arrangement. Comparatively, the trailing pivoting joint is provided between an implement attachment section of the articulating tongue arrangement and a trailing end portion of the articulating beam assembly. The articulating tongue arrangement further includes at least one beam assembly actuator, such as a hydraulic cylinder, which can be controlled to adjust the effective tow length of the articulating tongue arrangement (and, specifically, the effective tow length of the articulating beam assembly). In certain embodiments, the articulating tongue arrangement may also include one or more additional actuators for adjusting the pivot angles of the tongue assembly, as taken about the leading and trailing pivoting joints, to provide additional navigation control or "steerability" of the implement through active posturing of the articulating tongue arrangement.

As just stated, embodiments of the articulating tongue arrangement include an articulating beam assembly, which enables adjustment of the effective tow length of the tongue arrangement. The articulating beam assembly can be imparted with various designs or constructions enabling adjustment of the effective tow length of the tongue arrangement utilizing, for example, at least one hydraulic cylinder, hydraulic motor, or electrical actuator serving as the beam assembly actuator. Such constructions include, but are not limited to, structural configurations incorporating dual rack and pinion designs, telescopic arms or beams, and designs incorporating multi-bar (e.g., planar 2-bar or 4-bar) linkages. This notwithstanding, the articulating beam assembly beneficially incorporates an open chain, planar, 2-bar linkage or "hinged beam design" in at least some embodiments. For example, in one embodiment in which the articulating beam assembly is imparted with a hinged beam design, the articulating beam assembly may contain a leading beam and a trailing beam, which are pivotally joined at an intermediate pivoting joint; that is, such that pivoting or hinge-like motion can occur at the intermediate pivoting joint, possibly in addition to relative movement between the leading and trailing beams in other DOFs. More generally, the articulating tongue arrangement can contain any practical number of actuators enabling the functionalities described herein and permitting controlled adjustments in the effective tow length of the articulating tongue arrangement; and, in various embodiments, the articulating tongue arrangement may be produced to have a one, two, or three cylinder design, as discussed more fully below.

Continue the example above, a leading end portion of the leading beam may be joined to the above-mentioned vehicle attachment section via a leading pivoting joint, while a trailing end portion of the trailing beam may be joined to the implement attachment section via a trailing pivoting joint. Such a structural arrangement effectively provides the articulating tongue arrangement with a leading pivoting joint, a trailing pivoting joint, and an intermediate pivoting joint, which may permit pivoting rotation about axes having substantially upright orientations and extending substantially parallel to one another in at least some embodiments of the articulating tongue arrangement. In other embodiments, one or more of the pivoting joints may permit pivoting rotation about an axis having a different spatial orientation; e.g., such that articulating tongue arrangement is capable of folding in a scissor-like motion in a plane other than an essentially horizontal plane, as taken when the tow vehicle pulls the agricultural implement over flat or level terrain. The provision of such an intermediate pivoting joint, in particular, not only facilitates adjustments in the effective tow length of the articulating beam assembly (and, more generally, the articulating tongue arrangement), but further enables arm-like rotation of the leading and trailing beams to impart the articulating tongue arrangement with still greater freedom of movement useful in positioning an agricultural implement relative to a tow vehicle during certain operational scenarios, examples of which are discussed below.

Embodiments of the articulating tongue arrangement thus favorably increase maneuverability or steerability of an agricultural implement relative to a tow vehicle through adjustments in effective tow length of the articulating beam assembly and, in certain cases, through controlled pivoting about an intermediate pivoting joint of the beam assembly. In certain cases, posturing of the articulating tongue arrangement may occur exclusively in a manually-controlled, non-automated manner; that is, solely in response to operator input commands, as received via a joystick or other input device located in the tractor cabin, to control tongue assembly movement or posturing on a movement-by-movement basis. In other embodiments, any number of automatically-implemented movement functions of the tongue assembly may be implemented utilizing a processing sub-system or "controller architecture" associated with the articulating beam assembly and located onboard the tow vehicle, the towed implement, the tongue arrangement, or a combination thereof. Such computer-implemented functions, referred to herein generally as "auto-articulation tongue functions," are carried-out by an articulating tongue system including the controller architecture and the articulating tongue arrangement. As described further below, any number of auto-articulation tongue functions may be performed in response to operator input commands, such as operator input commands switching the articulating tongue arrangement between deployed (active use) and transport modes of operation. Additionally or alternatively, one or more auto-articulation tongue functions may be selectively performed in response to a different trigger event; e.g., reception of sensor data indicating the occurrence of a particular trigger event, such as the end of bale formation and ensuing bale ejection. For example, in embodiments, certain auto-articulating tongue functions may be triggered by detection of conditions warranting a modification in the implement feedrate, such as variations in the rate at which a baler intakes crop material during the bale formation to reduce abrupt changes in motion when encountering plugs or other variations in ingested crop density.

Generally, then, embodiments of the articulating tongue system can perform any number of auto-articulating tongue functions during usage of the tongue arrangement in pulling an agricultural implement, including zero, one, or multiple auto-articulating tongue functions. Further, operation of the articulating tongue system may be customizable such that selected auto-articulating tongue functions may be activated or deactivated in response to operator input (e.g., as received by operator interaction with a Graphic User Interface (GUI) settings screen), in response to the attachment of varying types of agricultural implements, or in response to other criteria. Such auto-articulating tongue functions, which may be implemented utilizing embodiments of the articulating tongue arrangement, can include deployed/transport mode switching functions (e.g., to provide improved stability and maneuverability when transporting an agricultural implement on public roadways using the tongue arrangement), row following functions (e.g., to maintain a baler in a windrow-centered position with reduced demands for repeated changes in tractor heading or weaving), adaptive feedrate functions (e.g., to minimize abrupt changes in tractor motion during the bale formation process), bale positioning functions (e.g., to decrease the likelihood of downhill rolling when ejecting round bales in hills), and bale formation/ejection assistance functions. Examples of such auto-articulating tongue functions are described below. Certain auto-articulating tongue functions, such as the deployed/transport mode switching functions, may be beneficially performed in conjunction with a wide range of towed agricultural implements. Other functions are usefully performed in conjunction with specific types of towed agricultural implements; e.g., the above-noted bale positioning and bale formation/ejection assistance functions may be beneficially performed when the articulating tongue arrangement is utilized in towing balers, such as round balers.

Additional description of example auto-articulating tongue functions usefully performed by embodiments of the articulating tongue system are discussed below in connection with FIGS. 10-12. First, however, example structural implementations of the articulating tongue arrangement and, more broadly, the articulating tongue system are discussed in connection with FIGS. 1-9. While the example embodiments of the articulating tongue arrangement is described below in conjunction with a particular type of towed agricultural implement (namely, a round baler) pulled utilizing a particular type of tow vehicle (namely, a tractor), embodiments of the articulating tongue arrangement can be utilized in conjunction with various different agricultural implements and tow vehicles. Accordingly, the following description is provided by way of non-limiting illustration only and should not be construed to unduly restrict the scope of the appended Claims in any manner.

Example Articulating Tongue Arrangements and Agricultural Implements

FIG. 1 schematically depicts an example round baler 20, which may be joined to a tow vehicle, such as a tractor, in a tow configuration utilizing an articulating tongue arrangement 22. The articulating tongue arrangement 22 is schematically represented in FIG. 1 as a single box for illustrative clarity, with several example embodiments of the tongue arrangement 22 shown and discussed below in connection with FIGS. 2-9. First, however, the round baler 20 is described in greater detail to provide an example context in which embodiments of the articulating tongue arrangement 22 may be better understood. The example round baler 20 includes a main frame or baler housing 26; a baling compartment 28 located in baler housing 26; a runner assembly 24 located adjacent a lower, aft section of the baling compartment 28; and a pair of ground-engaging wheels 30 supporting baler housing 26. Round bales (that is, bales having a generally cylindrical shape and potentially having squared shoulders) are formed with the baling compartment 28 as the round baler 20 is towed across a field utilizing a tow vehicle, such as a tractor 76 shown in FIG. 2. Machinery contained in the round baler 20 may be mechanically driven by an engine of the tow vehicle through a non-illustrated power take-off (PTO) shaft, which is connected to a corresponding shaft (e.g., via a splined coupling) when the round baler 20 is joined to the tow vehicle by the articulating tongue arrangement 22. Additionally, various functions of the round baler 20 may be powered through hydraulic, pneumatic, and/or electrical connections, which extend from the tractor 76 (FIG. 2), across the articulating tongue arrangement 22, and to the round baler 20.

A system of bale-forming belts 36, 38 is positioned about the baling compartment 28 of the round baler 20 and include a number of belt runs, such as front and rear belt runs. The bale-forming belts 36, 38 are supported by multiple rotatable shafts or rollers 40, which are mounted transversely across opposing sidewalls of the baler housing 26. Tensioning arms 42 tension the bale-forming belts 36, 38 around a given crop bale as the bale is formed within the baling compartment 28. Front and rear idler rolls 44, 46 cooperate with the belt runs and the tensioning arms 42 to impart the baling compartment 28 with a variable volume, which adjusts in relation to the size or diameter of the crop bales formed in the chamber 28. The round baler 20 may include various other non-illustrated components to further tension the bale-forming belts 36, 38 in embodiments, such as any number of tensioning springs or hydraulic cylinders. As the round baler 20 is towed across a field, a crop intake assembly 34 gathers crop material, such as a cut hay or another cereal grain, into the baling compartment 28. To deliver the collected crop material into the baling compartment 28, a crop intake opening 48 is provided adjacent a bottom portion of the baling compartment 28, with a pickup 50 gathering the crop material into the intake opening 48. A starter roll 52, mounted transversely within the baler housing 26 proximate the crop intake opening 48, facilitates bale formation by stripping crop material carried downwardly by the front run of the belt system 36, 38. The ingested crop material is then rolled into a cylindrical shape within the baling compartment 28 by a turning or tumbling motion induced by rotation of the bale-forming belts 36, 38. An example of a newly-produced crop bale 54, as formed by the rolling motion of the bale-forming belts 36, 38, is shown in phantom FIG. 1 and further illustrated in FIG. 2, as described below.

After the crop bale 54 reaches a desired size, a wrap material supply system 56 is activated to wrap the newly-formed crop bale 54 with a length of wrap material, such as a relatively thin mesh or netting. When activated, the wrap material supply system 56 feeds wrap material drawn from a wrap material roll 58 into the baling compartment 28. Wrapping of the crop bale 54 may be initiated by commanding a linear actuator 60 to extend an output shaft 62, which is shown in its retracted state in FIG. 1. Extension of the actuator output shaft 62 places the wrap material roll 58 in engagement with a spinning feed roll 64, which may have a tacky outer surface, thereby drawing material from the wrap material roll 58. Extension of the output shaft 62 also rotates a counter-knife arm 66 in a first rotational direction (counter-clockwise in the illustrated orientation). Further rotation of the crop bale 54 within the baling compartment 28, as induced by the action of the bale-forming belts 36, 38, then applies the wrap material about the outer periphery of the crop bale 54. Following application of a sufficient length of wrap material about the periphery of the crop bale 54, the wrap material drawn from the wrap material roll 58 is severed by the wrap material supply system 56 (e.g., via retraction of the actuator output shaft 62 and rotation of the counter-knife arm 66 in a second, opposing direction), and the crop bale 54 is ejected from the baling compartment 28. To facilitate bale ejection, a pair of gate cylinders 68 (one of which can be seen in FIG. 1) are extended in manner swinging an aft hatch or baler gate frame 70 upwardly into an open position. The wrapped crop bale 54 is then discharged from the baling compartment 28 and onto the ground 72 for subsequent retrieval.

Figure 2:
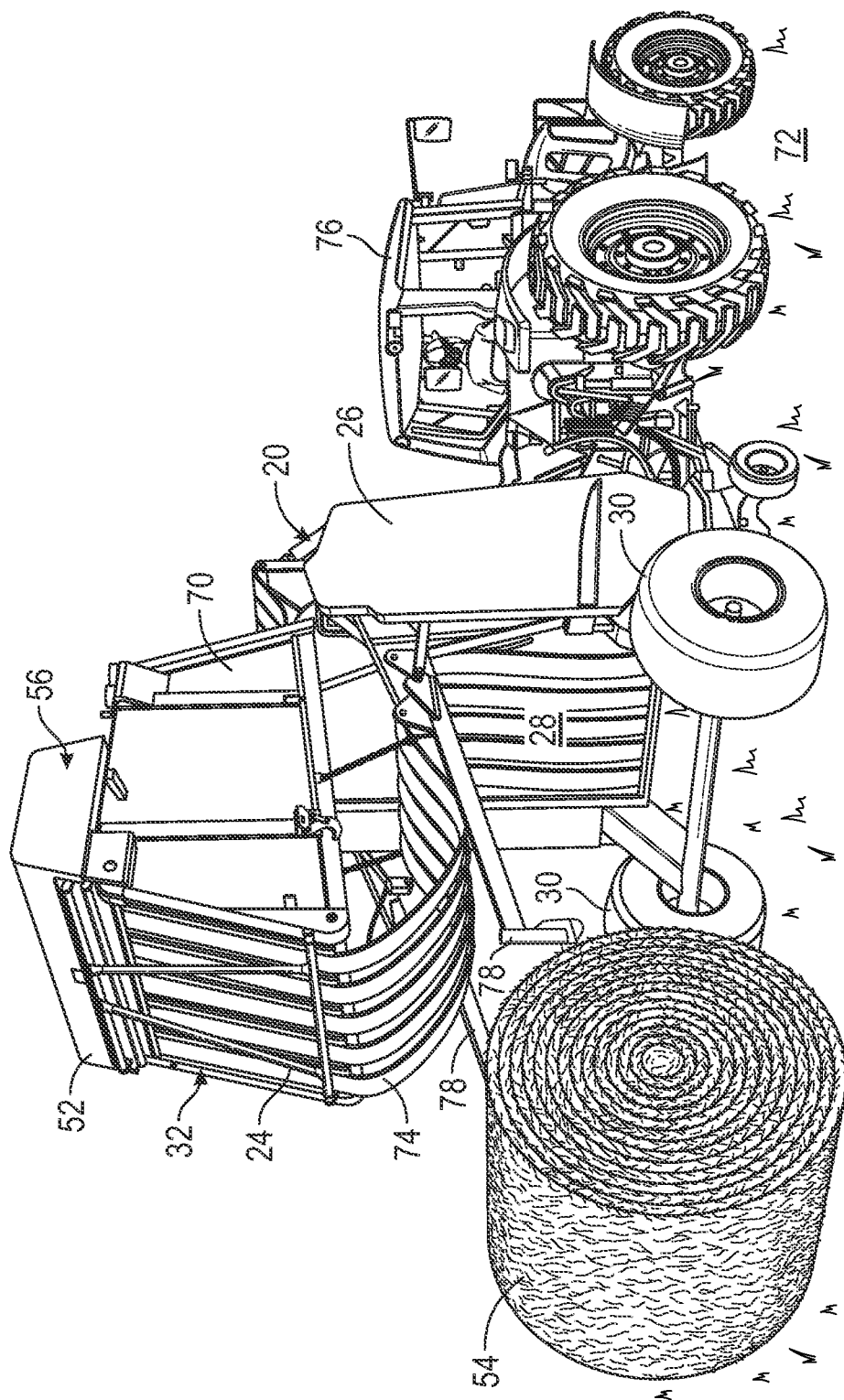
FIG. 2 is an isometric view of the example round baler (FIG. 1) connected to a tractor by the articulating tongue arrangement (hidden from view), as depicted during ejection of a bale from the baling compartment of the round baler.

FIG. 2 provides a perspective view of the example round baler 20 when ejecting the newly-wrapped crop bale 54 from the baling compartment 28 in the manner just described. The example tractor 76 to which the round baler 20 is connected via the articulating tongue arrangement 22 can also be seen in this drawing figure. With the baler gate frame 70 rotated into an open position for bale ejection, the runner assembly 24 is more clearly revealed, along with a crop conveyor system 32 further included in the round baler 20. The runner assembly 24 supports and serves as a physical guide for a conveyor belt run 74, which contains a series of conveyor belts or bands arranged in a side-by-side relationship. When the baler gate frame 70 is returned to the closed position shown in FIG. 1, the runner assembly 24 is generally located beneath the baling compartment 28 such that the weight of the conveyor belt runs 36, 38 urges the belt run 74 against the runner assembly 24. A pair of arms 78, or similar features, may be further provided to aid in ejection of the round bale 54 from the baling compartment 28, as dislodgement of round bales from the baling compartment 28 may require additional assistance in at least some instances depending upon, for example, the diameter of the newly-formed bale and the orientation of the round baler 20 if situated on a hill or other inclined surface.

Figure 3:
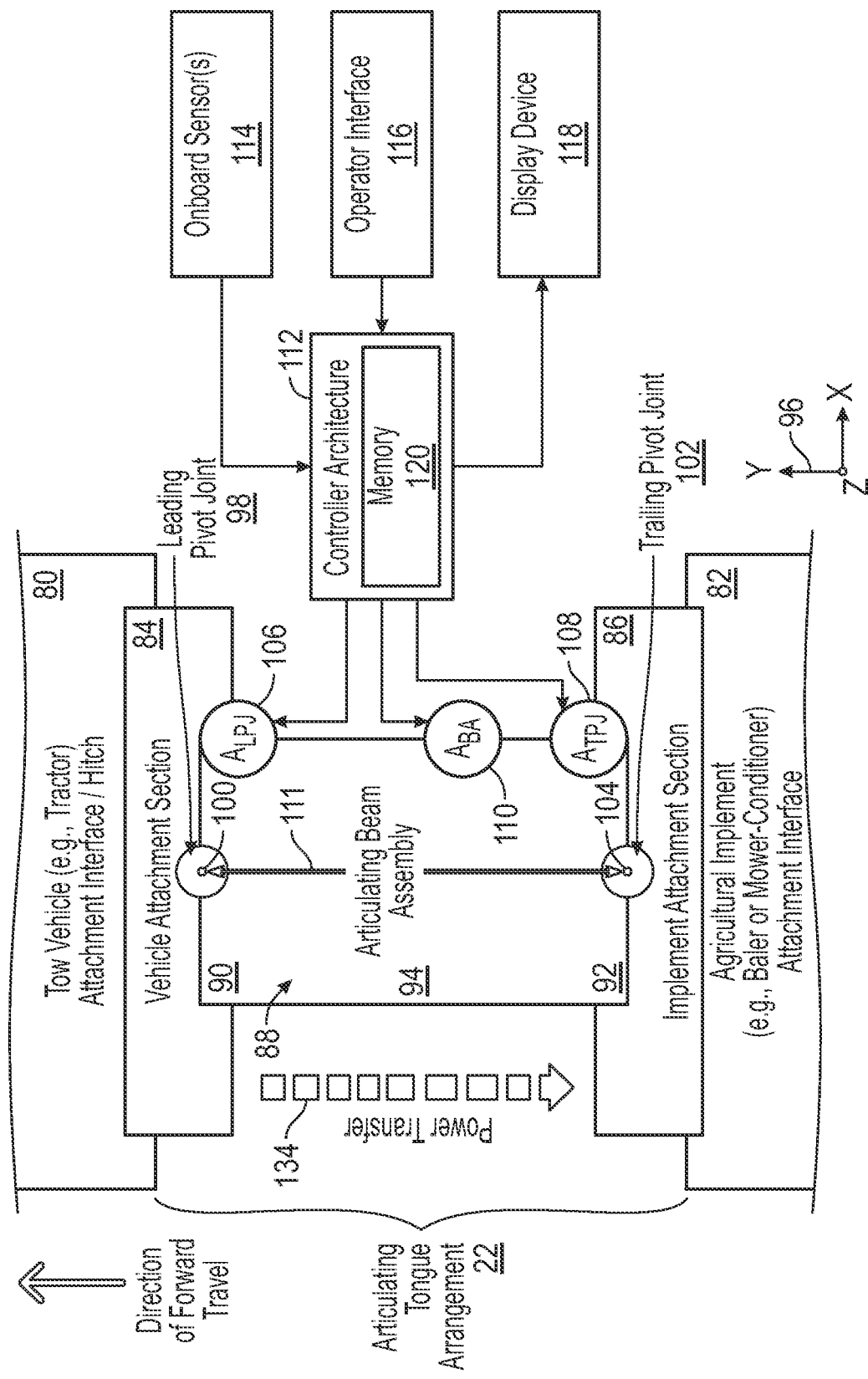
FIG. 3 is a generalized schematic of the articulating tongue arrangement and other associated components suitably included in an articulating tongue system, as illustrated in accordance with an example embodiment of the present disclosure.

Advancing to FIG. 3, a schematic of the articulating tongue arrangement 22 is depicted in accordance with a generalized example embodiment of the present disclosure. Also shown is a generalized representation of the attachment interface 80 of the tractor 76 (or other tow vehicle) to which the tongue arrangement 22 is connected; as well as a generalized representation of the attachment interface 82 of the round baler 20 (or other agricultural implement) connected to the tractor 76 via the tongue arrangement 22. In the illustrated example, the articulating tongue arrangement 22 includes a vehicle attachment section 84, an implement attachment section 86, and an articulating beam assembly 88 located between the sections 84, 86. The vehicle attachment section 84 is structurally configured or designed to facilitate mechanical joinder of the articulating tongue arrangement 22 to the attachment interface 80 of the tractor 76. To this end, the vehicle attachment section 84 can assume any structural form enabling selective attachment to and detachment from the tow vehicle attachment interface 80, with a 3-point hitch being a common example. A rigid or fixed coupling may be provided between the vehicle attachment section 84 and the tow vehicle attachment interface 80 in embodiments. In other instances, movement about one or more DOFs may be permitted between the vehicle attachment section 84 and the two vehicle attachment interface 80, such as rotation about the Y-axis of coordinate legend 96 to allow adjustments in roll and/or rotation about the X-axis of coordinate legend 96 to allow adjustment in pitch of the round baler 20 relative to the tractor 76 when, for example, traveling over terrain having an uneven or sloped topology.

Similarly, the implement attachment section 86 of the articulating tongue arrangement 22 may assume any structural form suitable for coupling the aft or trailing end of the tongue arrangement 22 to the attachment interface 82 of the round baler 20. In embodiments, the implement attachment section 86 may be joined to the round baler 20 in a semi-permanent manner not intended for routine in-field detachment by an operator. Alternatively, the implement attachment section 86 may be joined to the round baler 20 in a manner permitting relatively rapid, in-field interchange of the round baler 20 with other agricultural implements. In a general sense, the articulating tongue arrangement 22 can be provided as an independent apparatus or device, which can be freely interchanged with different tow vehicles and different tow implements. Alternatively, the articulating tongue arrangement 22 can be produced, marketed, and sold as an integrated part of a towed agricultural implement, such as the example round baler 20 (FIGS. 1-2); or, less commonly, as an integrated part of the tow vehicle (e.g., the tractor 76) itself. In a manner similar to the vehicle attachment section 84 of the articulating tongue arrangement 22, the implement attachment section 86 may be joined to the agricultural implement attachment interface 82 in a rigid or fixed manner; or, instead, relative movement between the implement attachment section 86 and the agricultural implement attachment interface 82 may be permitted in one or more DOFs. This stated, it will often be the case that a more complex, multi-DOF joint (e.g., permitting relative movement about roll and pitch axes) is provided at the juncture between the tow vehicle attachment interface 80 and the vehicle attachment section 84 (or, perhaps, at one or more of the pivoting joints 98, 102, 176 of the articulating tongue arrangement 22, as described below), while a rigid attachment (or an attachment permitting highly constrained movement) is provided at the juncture between the implement attachment section 86 and the agricultural implement attachment interface 82.

As previously indicated, an articulating beam assembly 88 is positioned between the vehicle attachment section 84 and the implement attachment section 86 of the articulating tongue arrangement 22. As generally labeled in FIG. 3, the articulating beam assembly 88 includes a leading end portion 90, a trailing end portion 92, and an intermediate portion 94. The intermediate portion 94 of the articulating beam assembly 88 is located between end portions 90, 92, as taken along the length of the articulating beam assembly 88, which corresponds to Y-axis of a coordinate legend 96 in the drawing figure (further corresponding to the fore-aft axes of the tow vehicle and the tongue arrangement 22 in the illustrated orientation). The leading end portion 90 of the articulating beam assembly 88 is rotatably joined to the vehicle attachment section at a leading pivoting joint 98. The leading pivoting joint 98 may be realized utilizing a pin joint or another coupling permitting rotation of the articulating beam assembly 88 relative to the vehicle attachment section 84 and, therefore, relative to the tow vehicle attachment interface 80. Such rotation or pivoting action occurs about a leading pivoting joint axis 100, which has a generally upright orientation in the illustrated embodiment (corresponding to the Z-axis of coordinate legend 96 in FIG. 3). Further, as noted above, the leading pivoting joint 98 may permit movement in one or more additional DOFs beyond pivoting rotation in at least some embodiments.

In a manner akin to the leading end portion 94 of the articulating beam assembly 88, the trailing end portion 92 of the articulating beam assembly 88 is movably or pivotally coupled to the vehicle attachment section at a trailing pivoting joint 102, which permits rotation of the beam assembly 88 relative to the implement attachment section 86 (and, therefore, relative to the agricultural implement attachment interface 82) about a trailing pivoting joint axis 104. The trailing pivoting joint axis 104 may also have a generally upright orientation; and, therefore, may extend substantially parallel to the leading pivoting joint axis 100 in the illustrated example. Finally, in certain embodiments, the articulating beam assembly 88 may be produced to further include at least one additional pivoting joint axis, which is referred to herein as a "central" or "intermediate" pivoting joint axis. When provided, the intermediate pivoting joint axis may also have a substantially upright orientation and, consequently, may also extend substantially parallel to the leading and trailing pivoting joint axes 100, 104. Additional description of an articulating beam assembly 88 including such an intermediate pivoting joint (identified by reference numeral "176") is provided below in connection with FIGS. 6-9. Again, as is the case with the leading pivoting joint 98, the trailing pivoting joint 102 and/or the below-described intermediate pivoting joint 176 may also permit relative movement about one or more DOFs in addition to permitting the pivoting or hinge-like motion discussed in detail below. In other implementations. the pivoting joints 98, 102, 176 may confine or restrict relative movement between the pertinent structural elements or components to pivoting or swiveling motions, with additional freedom of movement (e.g., to accommodate pitch and roll changes of the agriculture implement as the agricultural implement follows the local ground topology) enabled by multi-DOF joints provided at the juncture between the vehicle attachment section 84 and the tow vehicle attachment interface 80 and/or at the juncture between the implement attachment section 86 and the agricultural implement attachment interface 82, as previously discussed.

With continued reference to FIG. 3, the example articulating tongue arrangement 22 further includes three actuators: (i) a leading pivoting joint actuator 106 (abbreviated as "$A_{LPJ}$"), (ii) a trailing pivoting joint actuator 108 (abbreviated as "$A_{TPJ}$"), and (iii) a beam assembly actuator 110 (abbreviated as "$A_{BA}$"). In alternative embodiments, the articulating tongue assembly 22 may contain a lesser or greater number of actuators, noting that a two actuator design can be produced in which two actuators (e.g., two hydraulic cylinders) are integrated into a mid-portion of the articulating tongue assembly 22 to control relative angular movements of the tongue assembly sections. The leading pivoting joint actuator 106 is controllable to vary the pivot angle of the vehicle attachment section 84 relative to the leading end portion 90 of the articulating beam assembly 88, as taken about the leading pivoting joint axis 100. Similarly, the trailing pivoting joint actuator 108 is controllable to vary the pivot angle of the implement attachment section 86 relative to the trailing end portion 92 of the articulating beam assembly 88, as taken about the trailing pivoting joint axis 104. Lastly, the beam assembly actuator 110 is controllable to vary an effective tow length of the articulating beam assembly 88; and, in embodiments in which the articulating beam assembly 88 is imparted with an intermediate pivoting joint, to further vary or control rotational displacements about the intermediate pivoting joint or axis. As appearing herein, the term "effective tow length" refers to a straight line distance between the leading pivoting joint 98 (and, specifically, the leading pivoting joint axis 100) and the trailing pivoting joint 102 (and, by extension, the trailing pivoting joint axis 104) of the articulating tongue arrangement 22, as represented in FIG. 3 (and in FIGS. 6 and 7) by a double-headed arrow 111. The effective tow length may be referred to as a key dimension of the articulating beam assembly 88 specifically or, more broadly, of the articulating tongue arrangement 22. Finally, in certain embodiments, one or more of the actuators 106, 108, 110 (when provided) may be operable in float mode in which movement of the actuator (e.g., piston stroke when the actuators assume the form of hydraulic pistons) occurs in a passive manner in response to external forces acting on the relevant actuator.

The leading pivoting joint actuator 106, the trailing pivoting joint actuator 108, and the beam assembly actuator 110 (collectively referred to herein as the "tongue arrangement actuators" 106, 108, 110) can assume any form suitable for performing the above-noted rotational control or pivoting functions. Accordingly, the tongue arrangement actuators 106, 108, 110 may assume the form of various types of linear or rotary actuators (e.g., motors) in embodiments, whether electrical or hydraulic in nature. In many cases, at least one, if not all of the tongue arrangement actuators 106, 108, 110 will be implemented utilizing one or more hydraulic cylinders. Further, while certain benefits are gained by furnishing the articulating tongue arrangement 22 with a leading pivoting joint actuator (e.g., the leading pivoting joint actuator 106) and a trailing pivoting joint actuator (e.g., the trailing pivoting joint actuator 108), alternative embodiments of the articulating tongue arrangement 22 can omit one or both of these actuators to allow free rotation of the relevant components about the leading and trailing pivoting joint axes 100, 104. This may be desirable to, for example, reduce part count and cost in embodiments in which the articulating tongue arrangement 22 is utilized to tow an agricultural implement directly behind a tow vehicle, while providing certain functions through active adjustment of the effective tow length, as further discussed below in connection with FIG. 10. In other embodiments, the articulating tongue arrangement 22 may be furnished with each of the schematically-depicted tongue arrangement actuators 106, 108, 110 to provide greater control over the posturing of the tongue arrangement 22 and positioning of the towed agricultural implement (e.g., the round baler 20).

As schematically depicted in a central portion of FIG. 3, the tongue arrangement actuators 106, 108, 110, are each operably connected to a processing subsystem or "controller architecture" 112. The controller architecture 112 is, in turn, operably coupled to any number of sensors 114 located onboard the tractor 76 (or other tow vehicle), the round baler 20 (or other towed agricultural implement), the articulating tongue arrangement 22, or a combination thereof. In various embodiments, the controller architecture 112 may also be operably to an operator interface 116 and a display device 118, which are each located within a cabin of the tractor 76. The articulating tongue arrangement 22, the controller architecture 112, and the sensors 114, the operator interface 116, and the display device 118 are referred to herein as collectively forming an "articulating tongue system 22, 112." Further, the connections between the controller architecture 112 and the other components 114, 116, 118 of the articulating tongue system 22, 112 are denoted by signal communication lines in the illustrated example, with the communication lines representing wireless data connections, wired data connections, or any combination thereof. For clarity, the actuator command connections shown in schematic of FIG. 3 are represented by lines connecting the controller architecture 112 and the tongue arrangement actuators 106, 108, 110; however, it will be understood that the controller architecture 112 may communicate with any components controlling the movement of the actuators 106, 108, 110, as appropriate. For example, in implementations in which the actuators 106, 108, 110 assume the form of hydraulic cylinders, the controller architecture 112 of the articulating tongue system 22, 112 may be operably coupled to the valve actuators utilized to modulate the flow control valves and/or pumps regulating pressurized hydraulic flow to the cylinders chambers to control the stroke of the hydraulic cylinders in the well-known manner.

The controller architecture 112 of the articulating tongue system 22, 112 can assume any form suitable for performing the functions described throughout this document. The term "controller architecture," as appearing herein, is utilized in a non-limiting sense to generally refer to the processing architecture of the articulating tongue system 22, 112. Accordingly, the controller architecture 112 can encompass or may be associated with any practical number of processors, control computers, navigational equipment pieces, computer-readable memories, power supplies, storage devices, interface cards, and other standardized components. Further, the controller architecture 112 can be realized as one or more processing devices or computers located onboard the tractor 76 (or another tow vehicle), the round baler 20 (or another towed agricultural implement), the articulating tongue arrangement 22 itself, or any combination thereof. The controller architecture 112 of the articulating tongue system 22, 112 may include or cooperate with any number of firmware and software programs or computer-readable instructions designed to carry-out the various process tasks, calculations, and control/display functions described herein. Such computer-readable instructions may be stored within a non-volatile sector of a memory 120 associated with the controller architecture 112. While generically illustrated in FIG. 3 as a single block, the memory 120 can encompass any number and type of storage media suitable for storing computer-readable code or instructions, as well as other data utilized to support the operation of the articulating tongue system 22, 112.

An output of the controller architecture 112 is coupled to an input of the display device 118 such the controller architecture 112 can provide video output signals, and possibly audio signals, to the display device 118 as appropriate to generate imagery thereon. When included in the articulating tongue system 22, 112, the display device 118 may assume the form of any image-generating device suitable for usage onboard the tractor 76. For example, the display device 118 may be mounted in the cabin of the tractor 76 at a location positioned for convenient viewing by an operator when seated within the tractor cabin, or the display device 118 may assume the form of a tablet or other portable electronic carried-into the tractor cabin by an operator. Similarly, the operator interface 116 can include or assume the form of any device or group of devices utilized by an operator of the tractor 76 to input data into or to otherwise control the articulating tongue system 22, 112; e.g., to activate and deactivate certain articulating tongue functions, as discussed below in connection with FIGS. 10-12. The operator interface 116 may include physical inputs (e.g. buttons, switches, dials, or the like) located on or proximate the display device 118, a touchscreen module integrated into the display device 118, or a cursor input device (e.g., a joystick, trackball, or mouse) for positioning a cursor utilized to interface with GUI elements generated on the display device 118. In many cases, the operator interface 116 may include at least one control lever or joystick, which may be utilized to control embodiments of the articulating tongue arrangement 22 (along with other functions of the tractor), as further discussed below.

The onboard sensors 114 can include any number and type of sensors providing data useful in performing any number of auto-articulating tongue processes, as described below in connection with FIGS. 10-12. This may include sensors for monitoring the posturing or movement of the articulating tongue arrangement 22 during usage thereof, such as by directly measuring or calculating angular displacements around the leading pivoting joint axis 100, the trailing pivoting joint axis 104, and the intermediate pivoting joint axis when present; e.g., as determined utilizing linear sensors (e.g., linear variable differential transducers) for measuring hydraulic cylinder stroke or rotary sensors (e.g., potentiometers or rotary variable displacement transducers) for directly measuring such angular displacements. So too may the onboard sensors 114 include inertial sensors for microelectromechanical sensors (MEMS) accelerometers, gyroscopes, or magnetometers for monitoring movement of different portions of the articulating tongue arrangement 22, the tractor 76, or the round baler 20; sensors (e.g., tilt sensors or MEMS gyroscopes) for monitoring local ground slope when applicable (e.g., as in the case of the below-described round bale placement functionality); receivers, chip sets, or the like for determining position utilizing a satellite navigation system including, but not limited to, Global Positioning System (GPS), Galileo, Global Navigation Satellite System (GNSS or GLONASS), or Compass-IGS01 in embodiments in which a georeferenced position of the towed agricultural implement is desirably monitored; and sonar, laser, or acoustic sensors for measuring obstacles in proximity of the towed implement, to list but a few examples. In certain embodiments, the articulating tongue system 22, 112 may also include one or more cameras mounted to the towed agricultural implement or an aft portion of the articulating tongue arrangement 22 to, for example, capture video feeds utilized in carrying-out the below-described row following functionalities.

Figure 4:
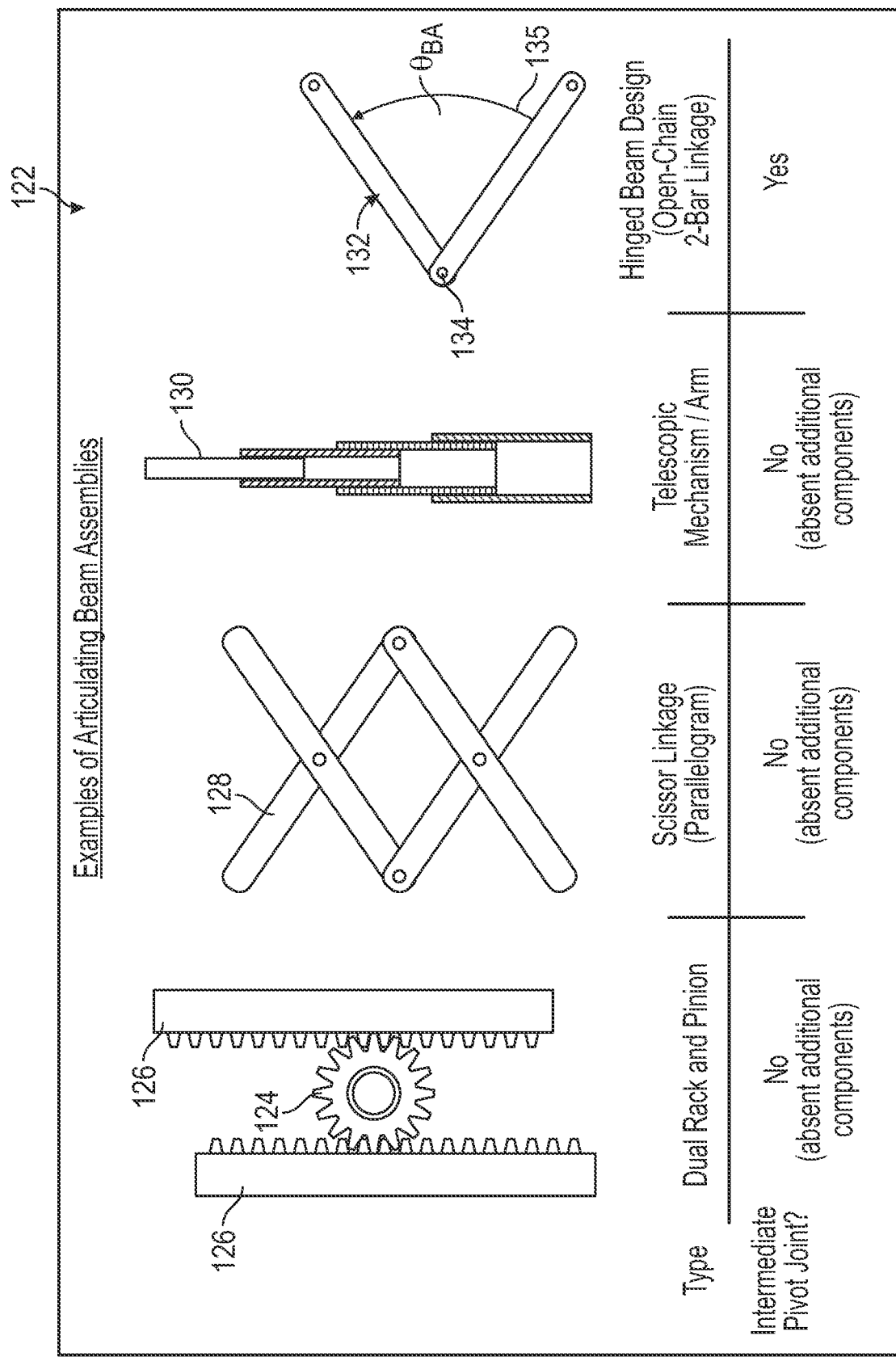
FIG. 4 illustrates several example types of base components, which can be integrated into the articulating beam assembly in embodiments of the articulating tongue arrangement.

Jointly referring to FIGS. 3 and 4, embodiments of the articulating beam assembly 88 included in the articulating tongue arrangement 22 can be assembled from various base components, which enable the effective tow length to be actively-adjusted or modified during usage of the tongue arrangement 22 through appropriate command signals transmitted from the controller architecture 112 to the beam assembly actuator 110. Additionally, and as previously noted, the articulating beam assembly 88 beneficially controls rotation about an intermediate pivoting joint in at least some embodiments of the present disclosure, with such an intermediate pivoting joint potentially (although non-essentially) extending substantially parallel to the leading and trailing pivoting joints 100, 104 of the articulating tongue arrangement 22. In a high level or conceptual sense, FIG. 4 schematically presents four examples of base components suitably incorporated into embodiments of the articulating beam assembly 88 to enable active adjustment or modification of the effective tow length of the beam assembly 88, as represented by a double-headed arrow 111 in FIG. 3. For example, and as indicated in the leftmost column of FIG. 4, a dual rack and pinion assembly or device 124, 126 can be integrated into the articulating beam assembly 88 to enable active adjustment of the effective tow length of the articulating beam assembly 88 and, therefore, the articulating tongue arrangement 22. When incorporated into the articulating beam assembly 88, such a rack and pinion device 124, 126 may include two racks 126, which are positioned to mesh with opposing sides of a central gear or pinion 124. A non-illustrated hydraulic motor or other actuator turns the pinion 124, when appropriate, thereby causing translational movement of the racks 126 in opposing directions to adjust the length of the articulating beam assembly 88. Various other components can and will also be included in the rack and pinion device 124, 126 to, for example, provide structural reinforcement; however, the general concept of providing a mechanical device allowing active retraction and extension (accordion-like) movement of the articulating bema assembly 88 will be readily appreciated by one of ordinary skill in the relevant field when referring to FIG. 4.

As further indicated in the center-left column of FIG. 4, embodiments of the articulating beam assembly 88 can further incorporate a scissor linkage, lazy tongue, or parallelogram linkage 128 as a base component or device enabling active adjustment of the effective tow length of the beam assembly 88 through extension and retraction through translation in single DOF. In this case, a non-illustrated actuator, such as a hydraulic cylinder, may be provided to control the extension and retraction of the linkage 128 in a manner similar to well-known scissor lift platforms; that is, such that a hydraulic cylinder is mounted between two links or a link and a non-illustrated frame, with extension and retraction of the cylinder causing corresponding extension and retraction of the scissor linkage. As a still further possibility, various telescoping arrangements or arms 130 (center-right column, FIG. 4) can be integrated into the articulating beam assembly 88 and controlled to adjust the effective tow length of the beam assembly 88 utilizing well-known actuation schemes conventionally employed in the context of, for example, the telescopic arms included in cranes and robotic mechanisms. Again, as will readily be appreciated by the skilled designer, various other components and will be included in such telescoping arm arrangements to provide the desired actuation and structural reinforcement functions in implementations in which the articulating bema assembly 88 is imparted with such a telescoping configuration.

As a still further possibility, an open-chain, planar, multibar linkage can be integrated into the articulating beam assembly 88 in embodiments of the present disclosure. Further illustrating this point, a generalized example of a folding, 2-bar or "hinged beam" linkage 132 is shown in the rightmost column in FIG. 4. The incorporation of the hinged beam linkage 132 (or a similar 2-bar linkage) into the articulating beam assembly 88 provides the articulating beam assembly 88 with an intermediate pivoting joint (corresponding to the pin joint 134 identified in FIG. 4), which allows greater flexibility or freedom of movement in positioning or steering a towed agricultural implement (e.g., the round baler 20) utilizing the articulating tongue arrangement 22. In such instances, the hinged beam linkage 132 may include leading and trailing beams forming a beam assembly pivot angle (identified by an arrow 135 in FIG. 4 and labeled as "$\theta_{BA}$"), which can be adjusted to vary the effective tow length of the articulating beam assembly 88 or to position a towed implement to a side of a tow vehicle, as discussed below in connection with FIGS. 6-9. In still other embodiments, such an intermediate pivoting joint can be formed by providing two instances of the dual rack and pinion 124, 126; the scissor linkage 128; or the telescoping arm 130 separated by the intermediate pin or pivoting joint. Various other structural arrangements of the articulating beam assembly 88 are also possible, providing that the beam assembly 88 can be moved in a manner providing controlled adjustments in the effective tow length separating the leading and trailing pivoting joints 98, 102 of the articulating tongue arrangement 22 through action of the beam assembly actuator 110 under command of the controller architecture 112.

Figure 5:
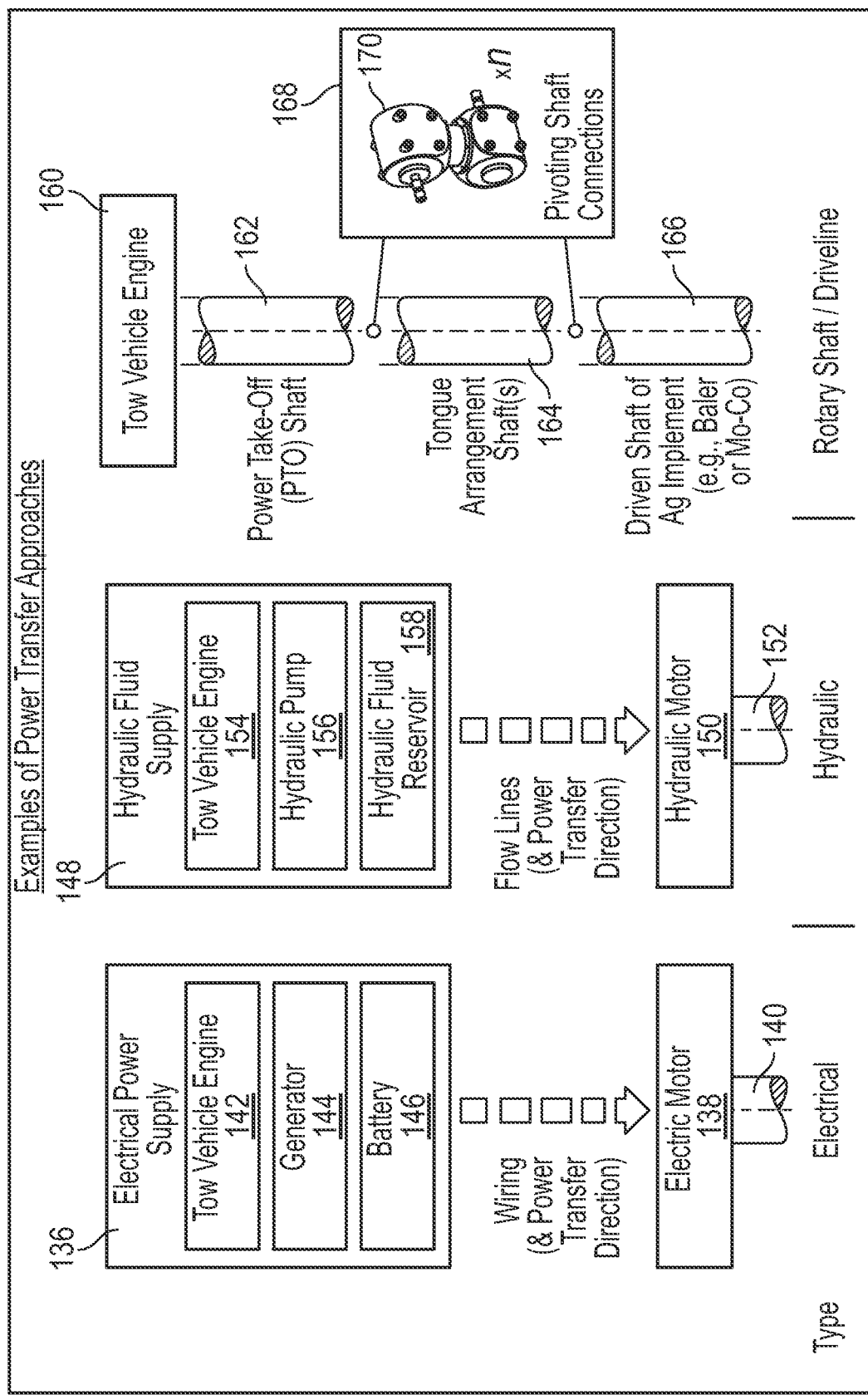
FIG. 5 illustrates several example power transfer approaches suitably utilized in isolation or in combination to provide power transfer from a tractor (or other tow vehicle), through the articulating tongue arrangement, and to a baler (or other towed agricultural implement) in embodiments of the present disclosure.

In certain instances, the agricultural implement connected to a tow vehicle via the articulating tongue arrangement 22 may be independently powered such that power transfer from the tow vehicle to the agricultural implement is unneeded. More commonly, a given towed agricultural implement will be at least partially powered by the tow vehicle in some manner, with power transfer occurring across the articulating tongue arrangement 22 (schematically indicated in FIG. 3 by an arrow 134). While other power transfer schemes (e.g., pneumatic schemes for supplying pressurized airflow to the agricultural implement) are not precluded, such power transfer from a tow vehicle, across the articulating tongue arrangement 22, and to a towed agricultural implement will often occur via a rotational driveline, via electrical power transfer conducted via wiring or cables spanning the articulating tongue arrangement 22, via hydraulic flow supplied via flow lines likewise spanning the tongue arrangement 22, or any combination thereof. Further emphasizing this point, FIG. 5 schematically depicts three generalized approaches for routing power from the tractor 76 (or another tow vehicle), through the articulating tongue arrangement 22, and to the round baler 20 (or another towed agricultural implement) in various embodiments of the present disclosure. While shown in different columns in FIG. 5 for illustrative clarity, the depicted approaches can be combined, noting that modern tractors often include a PTO shaft in additional to electrical and/or hydraulic couplings present at the tractor's rear for driving electrical and hydraulic functions of a wide range of towed implements and other tractor attachments.

Generally, in an electrical power transfer approach (left column, FIG. 5), an electrical power supply 136 onboard the tractor 76 provides electrical current and voltage supply via one or more cables or wire harnesses, which extend across the articulating tongue arrangement 22 to power one or more electrical components or loads onboard the baler 20 (or another towed implement). For example, electrical power may be supplied from the tractor 76, through the articulating tongue arrangement 22, and to the round baler 20 to power an electrical motor 138 onboard the baler 20 utilized to turn an output shaft 140 mechanically driving machinery on the baler in embodiments. As illustrated, such an electrical power supply 136 will often include a tow vehicle engine 142, a generator 144 for converting the mechanical power output of the engine 142 to electrical power, and various other such electrical components, such a battery 146. Comparatively, in a hydraulic power transfer approach (center column, FIG. 5), a hydraulic fluid supply 136 onboard the tractor 76 provides pressurized hydraulic flow routed over conduits spanning the articulating tongue arrangement 22 and extending to hydraulic components (e.g., a hydraulic motor 150 having an output shaft 152) onboard the baler 20. The hydraulic fluid supply 136 may generally again include a tow vehicle engine 154, a hydraulic pump 156 (e.g., an axial piston pump) driven by the engine 154, and various other hydraulic components, such as flow lines, valves, and a hydraulic fluid reservoir 158. While depicted as driving a hydraulic motor 150 in FIG. 5 to provide a convenient example, the pressurized hydraulic fluid routed to towed implement can drive any hydraulic load or device onboard the towed implement when applicable.

Addressing lastly the driveline power transfer approach shown in the right column of FIG. 5, in this approach operation of a tow vehicle engine 160 rotates a PTO shaft 162, which is rotationally coupled to and, thus, co-rotates with a number of shafts 164 contained in the articulating tongue arrangement 22. For example, a first or leading shaft included in the articulating tongue arrangement 22 may be joined to the PTO shaft 162 via a splined coupling present at (e.g., 3-point) hitch of the tractor 76. Similarly, a trailing shaft included in the articulating tongue arrangement 22 is rotationally coupled to an input shaft 166 of the towed agricultural implement, such as the round baler 20. The tongue arrangement shafts 164 co-rotate with the PTO shaft 162 due to this structural arrangement, with appropriate rotational couplings provided between the connected shafts. As indicated by a graphic 168 appearing on the left side of FIG. 5, rotational shaft-to-shaft couplings accommodating rotation or pivoting between shafts 162, 164, 166 are integrated into the articulating tongue arrangement 22 in such implementations. While U-joints or double cardan joints may be employed for this purpose, rotational couplings permitting shaft-to-shaft pivoting over greater angular ranges may be incorporated into embodiments of the articulating tongue arrangement 22, as will become apparent from the following description. In such embodiments, and as indicated in FIG. 5, any number of pivoting gearboxes 170 or other devices transmitting rotational motion between the tongue arrangement shafts 164, while permitting pivoting between such shafts 164 over relatively broad angular ranges (e.g., angular ranges approaches or exceeding 90 degrees) may be incorporated into the articulating tongue arrangement 22 in at least some instances. Again, any combination of the power transfer approaches shown in FIG. 5 may be employed, with various towed implements commonly powered through a driveline in addition to electrical and/or hydraulic couplings.

Figure 6:
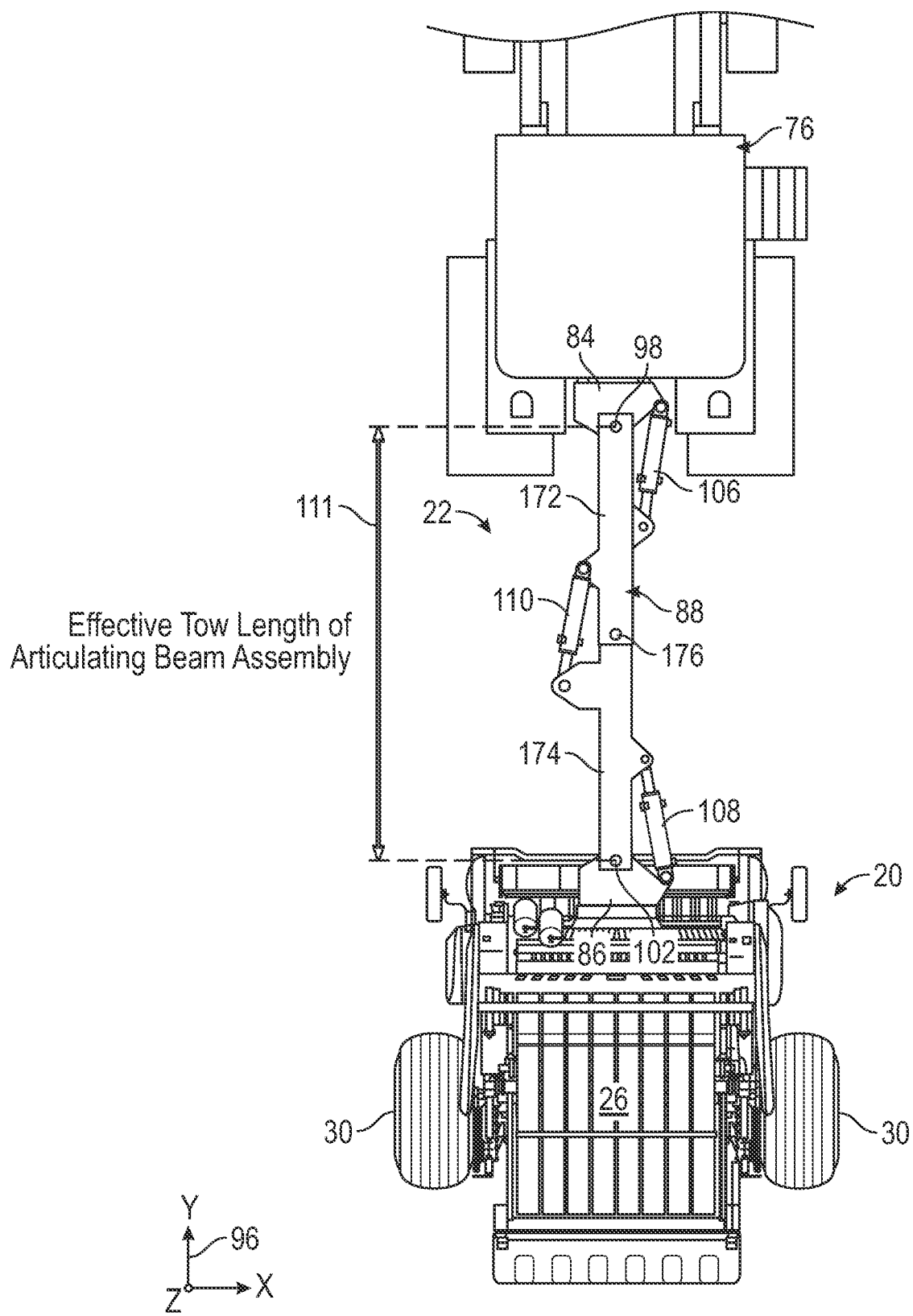
FIG. 6 is a top-down or planform schematic of the tractor (partially shown) and the round baler shown in FIGS. 1-2, as illustrated in conjunction with an example embodiment of the articulating tongue arrangement (depicted in an extended position in which a maximum effective tow length is provided between the leading and trailing pivoting joints of the tongue arrangement)
Figure 7:
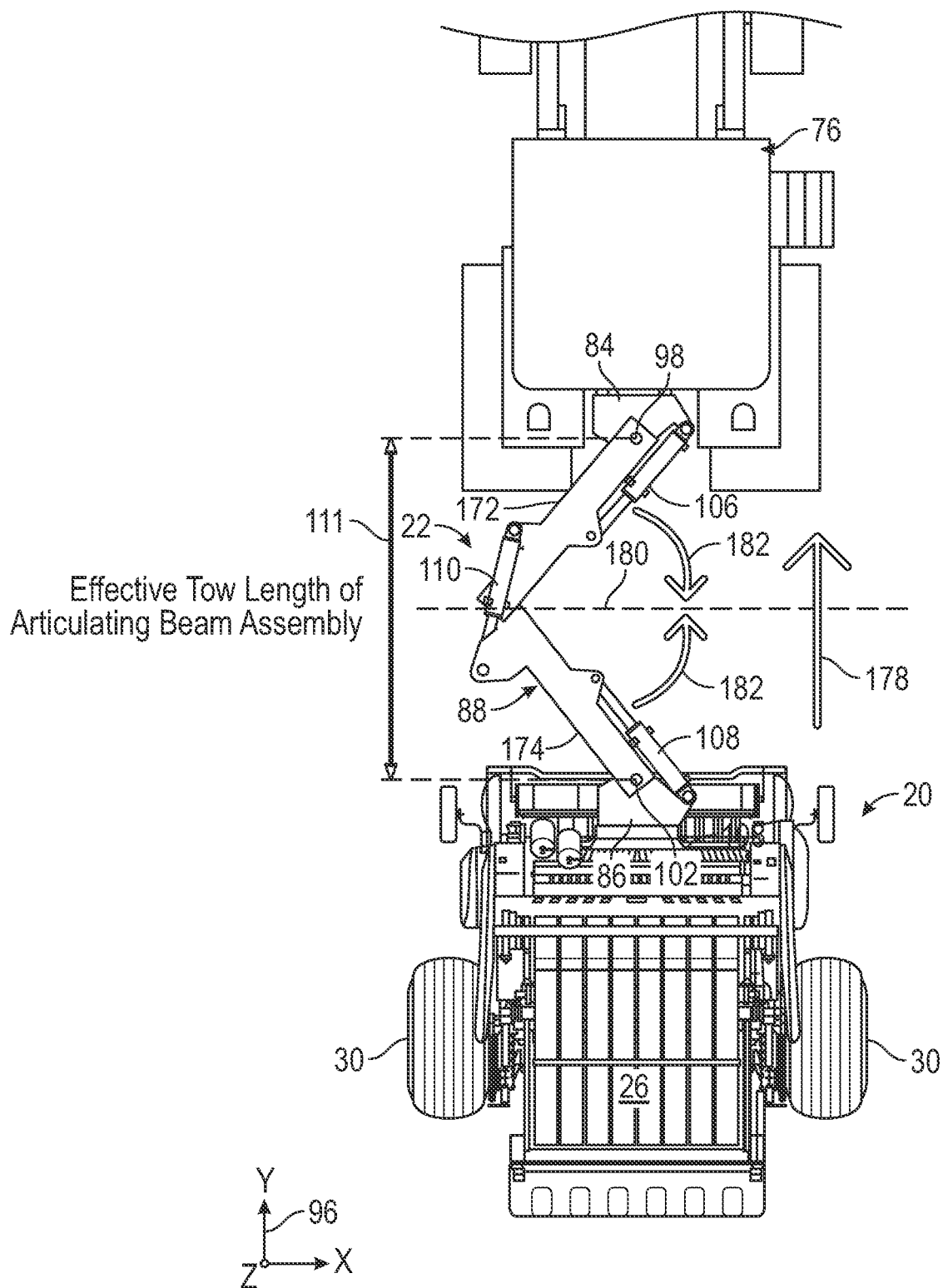
FIG. 7 is a top-down schematic of the tractor, the round baler, and the articulating tongue arrangement shown in FIG. 6, with the tongue arrangement residing in a retracted position providing a reduced (e.g., minimum) effective tow length between the leading and trailing pivoting joints of the tongue arrangement.

Progressing to FIGS. 6 and 7, an example implementation of the articulating tongue arrangement 22 is shown, with reference numerals carried forward as appropriate. As can be seen, the articulating beam assembly 88 is implemented utilizing a planar, closed-chain, 2-bar linkage or "hinged beam assembly" 172, 174 in the illustrated example. The hinged beam assembly 172, 174 includes a leading beam 172 and a trailing beam 174, which are joined at an intermediate pivoting joint 176 (visible in FIG. 6). Specifically, the leading beam 172 included in the hinged beam assembly 172, 174 has a first end portion (serving as the leading end portion 90 of the articulating beam assembly 88 identified in FIG. 3) and further has a second end portion, which is located opposite the first end portion taken along the length of the leading beam 172. Similarly, the trailing beam 174 has a third end portion (serving as the trailing end portion 92 of the beam assembly 88 identified in FIG. 3) and has a fourth end portion opposite the third end. The second end portion of the leading beam 172 is movably or pivotally coupled to the fourth end portion of the trailing beam 174 at the intermediate pivoting joint 176; here, realized using a pin joint coupling. The intermediate pivoting joint 176 may further enable rotation of the leading beam 172 relative to the trailing beam 174 over an angular range equal to or greater than 90 degrees in embodiments. The leading beam 172 and the trailing beam 174 may be imparted with essentially equivalent lengths such that the intermediate pivoting joint 176 is substantially equidistant between the leading pivoting joint 98 and the trailing pivoting joint 102, as measured along the length of the articulating beam assembly 88. In alternative implementations, however, the beams 172, 174 may be imparted with varying dimensions and the construction of the hinged beam assembly 172, 174 can otherwise differ in numerous respects relative to the depicted embodiment.

In the illustrated embodiment, the leading and trailing beams 172, 174 rotate in a plane extending substantially orthogonal to the axes of the pivoting joints 98, 102, 176 (corresponding to an X-Y plane of coordinate legend 96); that is, a substantially horizontal plane when the tractor 76 and the round baler 20 are traveling over level or flat terrain. The present example notwithstanding, the hinged beam assembly 172, 174 may be configured such that the beams 172, 174 rotate about the intermediate pivoting joint 176 when substantially parallel to the X-axis of the coordinate legend 96 in other implementations. So too may the pivoting joints 98, 102 permit rotation about axes substantially parallel to the X-axis of the coordinate legend 96 in embodiments, with the leading and trailing beams 172, 74 principally moving in the Y-Z plane of coordinate legend 96; e.g., such that the articulating tongue arrangement 22 is imparted with an inchworm-like movement pattern. Generally, then, the pivoting joints 98, 102, 176 of the articulating tongue arrangement 76 can each permit relative rotation between joined components or structural members about any suitable axis or combination of axes allowing the effective tow length of the articulating tongue arrangement 22 to be varied in a controlled manner and to support performance of at least one of the below-described auto-articulating tongue functions.

In the example embodiment of FIGS. 6 and 7, the leading pivoting joint actuator 106, the trailing pivoting joint actuator 108, and the beam assembly actuator 110 are each realized utilizing a single hydraulic cylinder. The hydraulic cylinder serving as the leading pivoting joint actuator 106 is mounted between the vehicle attachment section 84 of the articulating tongue arrangement 22 (affixed to the rear end of the tractor 76) and the leading beam 172 of the articulating beam assembly 88; e.g., each cylinder end may be mounted utilizing a rotational coupling or spherical (ball joint) coupling, as appropriate. Similarly, the hydraulic cylinder serving as the trailing pivoting joint actuator 108 is mounted between the implement attachment section 86 of the articulating tongue arrangement 22 (affixed to the leading end of the round baler 20) and the trailing beam 174 of the articulating beam assembly 88. Finally, the hydraulic cylinder serving as beam assembly actuator 110 is mounted between the leading beam 172 and the trailing beam 174 of the articulating beam assembly 88 such that extension and retraction of the cylinder determines the angular relationship between the leading and trailing beams 172, 174 (again, identified as angle "$\theta_{BA}$" in FIG. 4).

The articulating beam assembly 88 is shown in a fully extended position in FIG. 6. When in the fully extended position, the articulating beam assembly 88 provides a maximum effective tow length is provided between the leading and trailing pivoting joints 98, 102; and, in the illustrated example, angle $\theta_{BA}$ is substantially equivalent to 180°. Comparatively, the articulating beam assembly 88 is shown in a partially or fully retracted position such that a reduced or minimum effective tow length is provided between the leading and trailing pivoting joints 98, 102. The proportional relationship between the minimum effective tow length and the maximum effective tow length provided by the articulating tongue arrangement 22 will vary among embodiments; however, the maximum effective tow length will often be at least twice the minimum effective tow length in embodiments of the articulating tongue arrangement 22. As shown in FIG. 7, the controller architecture 112 (FIG. 3) can control the hydraulic cylinders or tongue arrangement actuators 106, 108, 110 to posture the articulating tongue arrangement 22 such that the round baler 20 (or another towed implement) is effectively pulled toward the tractor 76, as indicated by arrow 178. The round baler 20 remains in-line with the tractor 76 in this example as the tongue arrangement actuators 106, 108, 110 are controlled to converge the leading and trailing beams 172, 174 toward a mid-line 180 extending parallel to the X-axis of coordinate legend 96 and transecting the intermediate pivoting joint 176 (as further indicated in FIG. 7 by arrows 182). Conversely, the tongue arrangement actuators 106, 108, 110 can be controlled to move the round baler 20 in opposing, rearward direction away from the tractor 76, when so desired.

Figure 8:
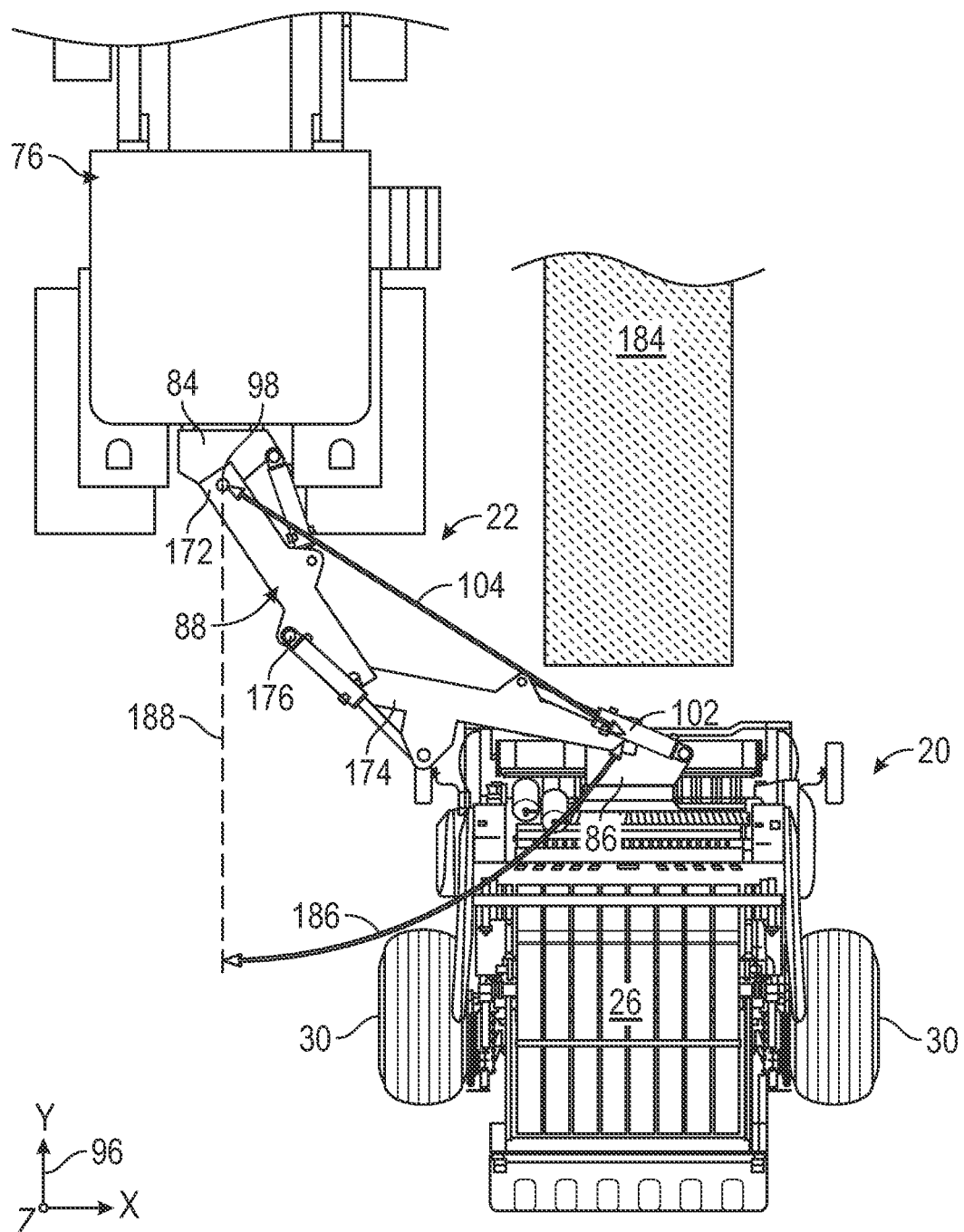
FIG. 8 is a top-down schematic of the tractor, the round baler, and the articulating tongue arrangement shown in FIGS. 6-7 illustrating an example manner in which the tongue arrangement may be controlled to maintain the round baler (or other agricultural implement) in a laterally offset, side-pull relationship with the tractor.

The articulating tongue arrangement 22 further enables lateral movement or steering of the round baler 20 to either side of the tractor 76. For example, as shown in FIG. 8, the articulating tongue arrangement 22 can be controlled to move the round baler 20 to a side of the tractor 76 to, for example, provide a row following function when gathering crop material from a window 184, as further discussed below in connection with FIG. 10. In this manner, the round baler 20 can be swung to a side of the tractor 76, while kept in relative close proximity to the tractor 76 (that is, while minimizing the effective tow distance) in contrast to conventional fixed-length tow arrangements. Such displacements of a towed implement brought about by posturing of the tongue arrangement 22 may be described in terms of lateral displacement measured along the X-axis of coordinate legend 96; or, instead, as an angle 186 taken about the leading pivoting joint 98 measured from a reference point, such as a fore-aft axis of the tractor 76 (represented by a dashed line 188 in FIG. 8).

Figure 9:
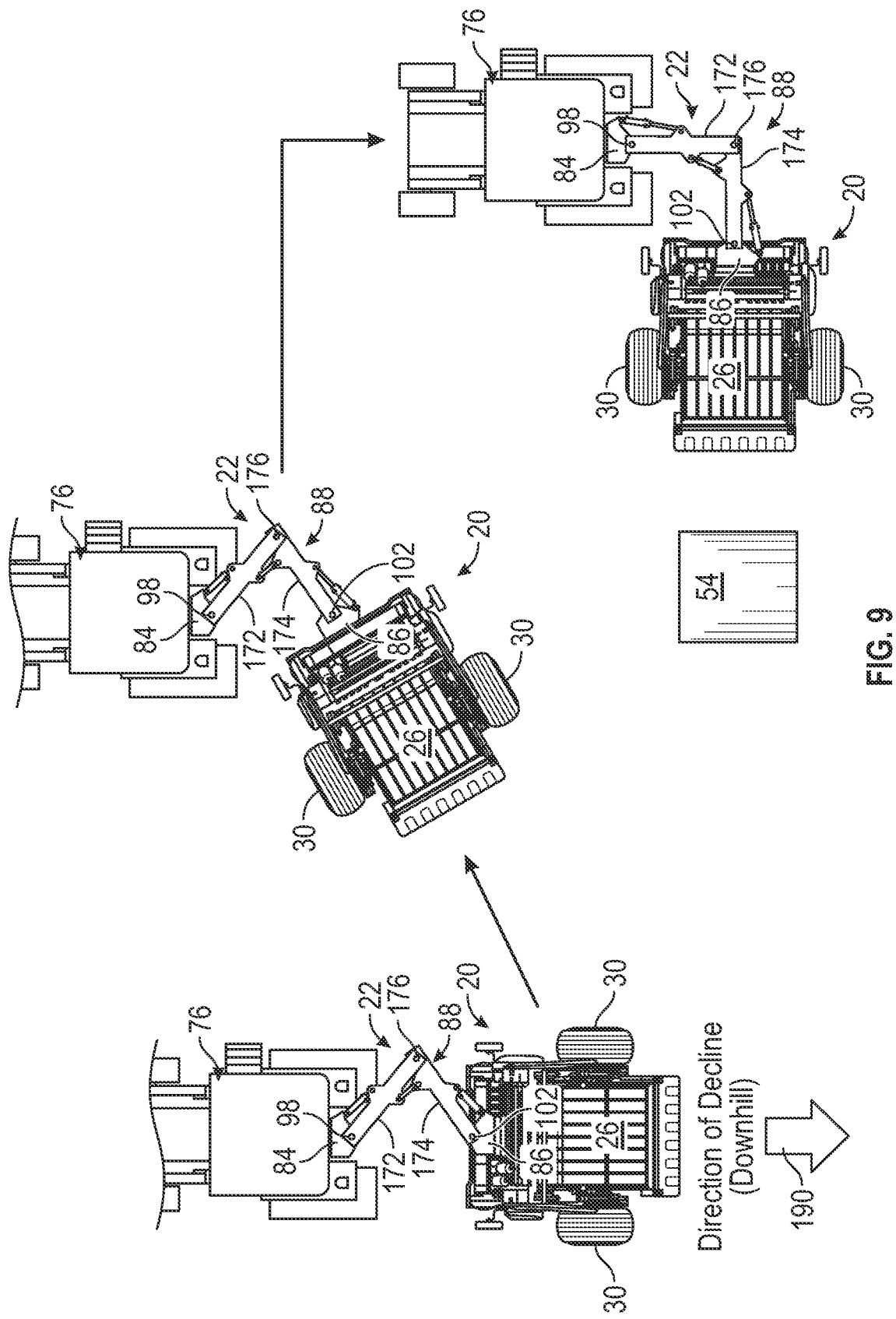
FIG. 9 is a top-down schematic of the tractor, the round baler, and the articulating tongue arrangement shown in FIGS. 6-8 illustrating a sequence of positions through which the tongue arrangement may move the round baler to, for example, position a round bale in a desired location and/or in a desired orientation upon ejection from the baler.

The articulating tongue arrangement 22 further enables movement of the round baler 20 through various orientations relative to the tractor 76 and, therefore, to assume various positions within the external environment in which the tractor 76 and the baler 20 operate. Consider, for example, FIG. 9 illustrating a sequence of example positions through which the round baler 20 may be moved by posturing of the articulating tongue arrangement 22 in combination with or in the absence of movement by the tractor 76. The illustrated sequence of movements may be performed when ejecting a round bale (e.g., the round bale 54 originally shown in FIGS. 1-2 and further shown in the bottom center of FIG. 9), in an orientation discouraging downhill rolling of the round bale 54 as the tractor 76 travels uphill, as indicated by an arrow 190. Stated differently, the articulating tongue arrangement 22 enables positioning of the round baler 20 in a jackknifed relationship with the tractor 76 with minimal movement and steering of the tractor 76 itself. In certain cases, the round baler 20 may be positioned in this manner (to eject the round bale 54 in a desired orientation) by an operator directly controlling the movement of the articulating tongue arrangement 22 via suitable controls included in the operator interface 116 (FIG. 3). In other embodiments of the articulating tongue system 22, 112, the controller architecture 112 (FIG. 3) may automatically command the articulating tongue arrangement 22 to move the round baler 20 into the appropriate orientation to achieve the desired bale position; e.g., in response to activation of this feature by an operator interacting with the operator interface 116 located in the cabin of the tractor 76. Further description of such a bale placement or positioning function and other enhanced, auto-articulating tongue functions is provided below in connection with FIG. 10.

As recently stated, movement of the articulating tongue arrangement 22 can be manually controlled via operator input commands received via the operator interface 116 in embodiments of the present disclosure. For example, in this case, an operator may interact with one or more joysticks, knobs, or other physical controls to control the extension and retraction of hydraulic cylinders serving as the tongue arrangement actuators 106, 108, 110. As a more specific example, a joystick located in the cabin of the tractor 76 may be capable of rotating about two perpendicular axes, with rotation of the joystick about a first axis (e.g., moving the joystick in a forward direction away from the operator or in a rearward direction toward the operator) controlling the extension and retraction of the articulating beam assembly 88. Comparatively, rotation of the joystick about a second axis (e.g., moving the joystick to the operator's left or right) may control the swing angle of the articulating tongue arrangement 22 (again, represented by arrow 186 in FIG. 8). This may occur while maintaining the implement in desired orientation relative to the tractor 76; e.g., such that the fore-aft or longitudinal axis of the towed agricultural implement is maintained in a parallel relationship with the fore-aft axis of the tractor 76, depending upon the particular function or task presently carried-out utilizing the implement.

In a general sense, the above-described control scheme is somewhat similar to other familiar control schemes utilized to control front end loader or backhoe attachments of the type commonly mounted to agriculture tractors. Further, an additional manual input, such as a rubberized dial or control knob, can also be provided to control the planform orientation or clocking of the towed agricultural implement (e.g., the round baler 20) via movements of the articulating tongue arrangement 22 in embodiments. Various other control schemes are also possible in further implementations, including control of the articulating tongue arrangement 22 through operator selection of interactive elements or widgets generated as part of a GUI screen or page produced on the display device 118 located in the cabin of the tractor 76 (or another tow vehicle). Regardless of the particular control scheme employed, the controller architecture 112 receives the operator input commands; determines the appropriate actuation commands to send to selected ones of the tongue arrangement actuators 106, 108, 110 to effectuate the operator commands; and then transmits the actuation commands to the appropriate components to control the actuators 106, 108, 110 accordingly.

In certain embodiments of the articulating tongue system 22, 112, the controller architecture 112 may further enable the execution of one or more auto-articulating tongue functions; that is, computer-implemented functions during which movement of the articulating tongue arrangement 22 is controlled by the controller architecture 112 in an automated manner in response to pertinent sensor data, in response to operator initiation (e.g., input commands placing the articulating tongue system 22, 112 in a particular mode of operation or triggering a movement sequence), or other criteria. Several example auto-articulating tongue functions will now be described in connection with FIG. 10. example auto-articulating tongue functions are described by of non-limiting example only, noting that any single function can be performed in isolation, multiple functions may be performed in combination (whether concurrently or sequentially), or none of the example functions may be carried-out in embodiments of the articulating tongue arrangement 22 (in which case movement of the articulating tongue arrangement 22 may simply be controlled by an operator on a movement-by-movement basis). Further, operation of the articulating tongue system 22, 112 may be customizable in at least some realizations such that various auto-articulating tongue functions may be selectively activated or deactivated by an operator (e.g., via interaction with a suitable GUI screen) or in response to the usage of different implement types with the articulating tongue arrangement 22; e.g., as automatically detected or as indicated by operator input data entered into an onboard computer system.

Figure 10:
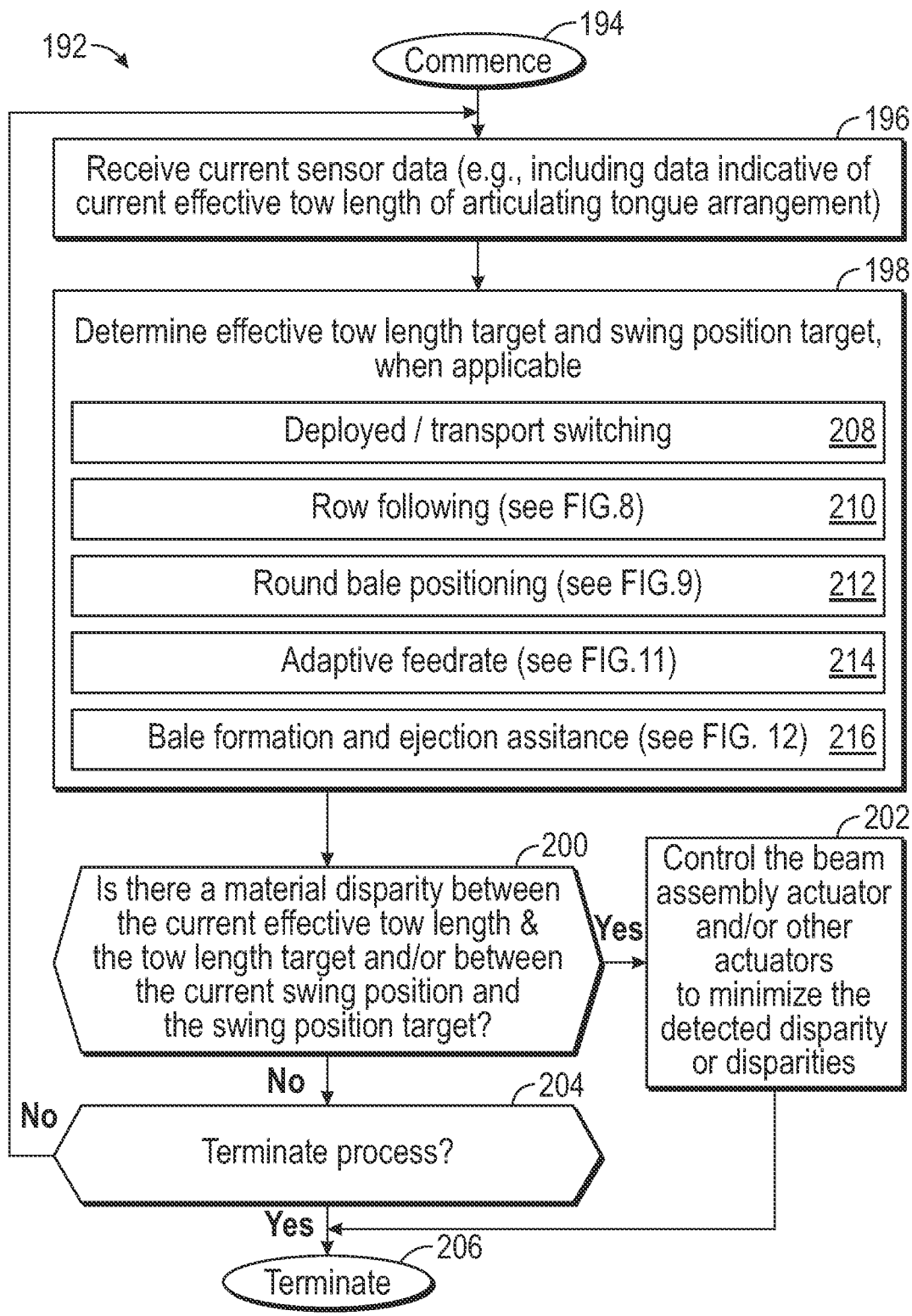
FIG. 10 is a flowchart illustrating an overarching process suitably carried-out by a processing subsystem or "controller architecture" associated with the articulating tongue arrangement to provide one or more auto-articulating tongue functions, as illustrated in accordance with an example embodiment of the present disclosure.

Referring now to FIG. 10, an example overarching process 192 is set-forth that is suitably carried-out by the controller architecture 112 of the articulating tongue system 22, 112 to selectively execute any number of articulating tongue functions during usage of the articulating tongue arrangement 22 in pulling a towed agricultural implement, such as the round baler 20, in embodiments of the present disclosure. The overarching process 192 (hereafter, the "auto-articulating tongue master process 192") includes a number of process STEPS 194, 196, 198, 200, 202, 204, 206, each of which is described, in turn, below. Additionally, as indicated during STEP 198, any number of auto-articulating tongue functions 208, 210, 212, 214, 216, may be applied by the controller architecture 112 in accordance with preestablished control schemes or algorithms stored in the memory 120 of the articulating tongue system 22, 112 (FIG. 3). Depending upon the particular manner in which auto-articulating tongue master process 192 is implemented, each step generically illustrated in FIG. 10 may entail a single process or multiple sub-processes. Further, the steps illustrated in FIG. 10 and described below are provided by way of non-limiting example only. In alternative embodiments of auto-articulating tongue master process 192, additional process steps may be performed, certain steps may be omitted, and/or the illustrated process steps may be performed in alternative sequences.

The auto-articulating tongue master process 192 commences at STEP 194 in response to the occurrence of a predetermined trigger event. The predetermined trigger event can be any event, condition, or occurrence desirably indicating that an auto-articulating tongue function is desirably performed at the present juncture in time or that it may be desirable to perform such a function during ensuing usage of a towed agricultural implement. In this regard, the auto-articulating tongue master process 192 may initiate at STEP 194 in response to tow vehicle startup, such as startup of the example tractor 76 shown in FIGS. 1 and 2, or to activation of a towed implement (e.g., the round baler 20) in embodiments. Alternatively, the trigger event may be entry of operator input requesting activation or execution of the auto-articulating tongue master process 192 or a selected one of the auto-articulating tongue functions 208, 210, 212, 214, 216; e.g., in one embodiment, an operator may interact with a GUI generated on the display device 118 to initiate the auto-articulating tongue master process 192 and select one or more of the articulating tongue functions for performance. In still other instances, the controller architecture 112 may commence the auto-articulating tongue master process 192 automatically (that is, without requiring operator input) when determining that the tow vehicle is engaged in a particular type of work task, when the tow vehicle is placed in a particular mode of operation, or when a particular type of towed agricultural implement is attached to the tow vehicle utilizing the articulating tongue arrangement 22.

Following commencement of the auto-articulating tongue master process 192, the controller architecture 112 progresses to STEP 194 and gathers any pertinent data inputs utilized in performing the remainder of the process 192. Such data inputs will vary in relation to the nature (implementation specifics) of the relevant auto-articulating tongue function, as further discussed below in connection with the example auto-articulating tongue functions 208, 210, 212, 214, 216. Generally, the data inputs collected during STEP 194 may include information received from sensors onboard the towed implement (e.g., the round baler 20), onboard the tow vehicle (e.g., the tractor 76), and/or integrated into the articulating tongue arrangement 22 itself. The sensor data gathered during STEP 194 of the master process 192 will generally include data from which the current posture of the articulating tongue arrangement 22 (including the current effective tow length of the articulating beam assembly 88) can be determined, such as data from any sensors monitoring rotational displacements about the pivoting joint axes of the pivoting joints 98, 102, 176; data from sensors monitoring the linear displacement or stroke of any hydraulic cylinders serving as the tongue arrangement actuators 106, 108, 110; data from MEMS sensors integrated into the articulating tongue arrangement 22 (if present); or other such data useful in monitoring the current positioning or movement characteristics of the tongue arrangement 22.

Additional data may also be gathered pertaining to the surrounding environment or the operational characteristics of the towed agricultural implement, depending upon the particular auto-auto-articulating tongue functions performed during STEP 198 of the master process 192, as described below. For example, if performing the below-described row following process (FUNCTION 210), the controller architecture 112 may receive a video feed from one or more cameras for visual analysis in identifying the position and shape of any windrow (or similar environmental objects) over or adjacent which the towed agricultural implement is presently traveling. If implementing the below-discussed bale positioning function (FUNCTION 212), the controller architecture 112 may receive data from suitable sensors (e.g., MEMS or tilt sensors) indicative of local ground slope or any obstacles in proximity of the baler 20. If executing the below-described adaptive feedrate function (FUNCTION 214), the controller architecture 112 may gather data directly indicative of the current feedrate of the towed implement (e.g., the round baler 20), the load placed on the tow vehicle engine when utilized to power the towed implement, data indicative of the current bale formation and ejection actions performed by the baler 20, and other data useful in determining or predicting the imminent power demands of the round baler (e.g., camera data utilized in monitoring crop density of the crop ingested into the towed implement). Finally, if executing the below-described bale formation and ejection assistance process (FUNCTION 216), the controller architecture 112 of the articulating tongue system 22, 112 may gather data or information indicative of the current stage in the bale formation and ejection process in which a towed baler (e.g., the round baler 20) is presently operating.

Advancing to STEP 198 of the auto-articulating tongue master process 192, the controller architecture 112 (FIG. 3) next determines an effective tow length target of the articulating beam assembly 88 and, when applicable, a swing position target of the articulating tongue arrangement 22. As appearing herein, the term "effective tow length target" refers to a desired or target value for the effective tow length of the articulating beam assembly 88, which, as noted repeatedly above, is a straight line measurement from the leading pivoting joint 98 to the trailing pivoting joint 102 of the tongue arrangement 22. Comparatively, the "swing position target" refers to the angle formed between the leading and trailing pivoting joints 98, 102, as measured about the leading pivoting joint axis in a reference plane substantially orthogonal to the leading pivoting joint axis. Again, such a reference plane may correspond to the X-Y plane of coordinate legend 96 in FIG. 8. As indicated above, the swing position target can be expressed as an angular displacement from a reference line, such as the fore-aft axis of the tractor 76 represented in FIG. 8 by the dashed line 188, as measured in a particular rotational direction. Additionally, in certain cases, the controller architecture 112 a desired orientation of the towed implement (e.g., the round baler 20) during STEP 198 when, for example, a bale positioning function 212 is carried-out. When determined, the desired orientation of the towed implement may be measured relative to the orientation of the tow vehicle (e.g., as an offset between the respective fore-aft or longitudinal axes of the round baler 20 and the tractor 76), relative to local ground slope or other local geographical features, or relative to another frame of reference.

The particular manner in which the controller architecture 112 (FIG. 3) determines the effective tow length target during STEP 198, as well as whether the controller architecture 112 further determines a swing position target (and, possibly, a target or desired orientation for the towed implement) will vary depending upon the particular auto-articulation tongue function carried-out at the present juncture in time. Five auto-articulation tongue functions 208, 210, 212, 214, 216 are presented in FIG. 10, with examples of each auto-articulation tongue function described in greater detail below. After determining the effective tow length target and the swing position target (if applicable) during STEP 198, the controller architecture 112 advances to STEP 200 of the auto-articulating tongue master process 192 and determines whether a material disparity exists between the relevant parameters and the current positioning provided by the articulating tongue arrangement 22. For example, with respect to the effective tow length target, the controller architecture 112 may compare a current effective tow length of the articulating beam assembly 88 (as calculated from sensor data) to the effective tow length target. If the disparity between these values exceeds a minimum acceptable threshold, the controller architecture 112 advances to STEP 202, determines the appropriate actuation commands to send to selected ones of the tongue arrangement actuators 106, 108, 110 to effectuate the operator commands; transmits the actuation commands to the actuators 106, 108, 110; and then progresses to the STEP 204 of the auto-articulating tongue master process 192. Otherwise, the controller architecture 112 proceeds directly to STEP 204 of the master process 192.

Thus, by performing STEPS 200, 202 in this manner, the controller architecture 112 maintains the effective tow length of the articulating beam assembly 88 in substantial conformance with the effective tow length target calculated during STEP 198 by iteratively sending appropriate commands to the beam assembly actuator 110, as well as the other tongue arrangement actuators 106, 108 when present. So too does the controller architecture 112 also transmit appropriate commands to the actuators 108, 110, 112 to maintain the current swing position of the agricultural implement in conformance with the swing position target calculated during STEP 198, when applicable. Finally, when a desired orientation of the baler 20 is determined during STEP 198, the controller architecture 112 likewise controls the tongue arrangement actuators 108, 110, 112 to orient the round baler 20 (or other towed agricultural implement) as desired. Here, it is noted that, in many instances, the controller architecture 112 will simply maintain the towed agricultural implement (e.g., the round baler 20) in a parallel relationship with the tow vehicle (e.g., the tractor 76). This stated, in carrying-out certain auto-articulating tongue functions (e.g., the below-described bale positioning function), the controller architecture 112 may move the round baler 20 through various non-parallel orientations with respect to the tractor 76. The posturing of the articulating tongue arrangement 22, as effectuated through appropriate movements of the tongue arrangement actuators 108, 110, 112, can be readily calculated during STEP 198 utilizing the above-described sensor input data monitoring the current positioning and movement characteristics of the articulating tongue arrangement 22 combined with the known dimensional parameters of the tongue arrangement 22, as recalled from the memory 120 (FIG. 3) of the articulating tongue system 22, 112.

Advancing next to STEP 204 of the auto-articulating tongue master process 192, the controller architecture 112 determines whether the current iteration of auto-articulating tongue master process 192 should terminate; e.g., due to tow vehicle shutdown, due to operator input deactivating all auto-articulating tongue functions, or due to removal of the condition or trigger event in response to which the process 192 was initially commenced at STEP 194. If determining that auto-articulating tongue master process 192 should terminate at STEP 200, the controller architecture 112 progresses to STEP 202 and terminates the master process 192 accordingly. Termination of the master process 192 may return to the articulating tongue system 22, 112 to a default mode of operation in which movements of the articulating tongue arrangement 22 are effectuated strictly in response to manual control. If instead determining that auto-articulating tongue master process 192 should continue, the controller architecture 112 returns to STEP 194 and the above-described process steps repeat or loop.

As noted above, several example of auto-articulating tongue functions 208, 210, 212, 214, 216 are shown in FIG. 10. The illustrated auto-articulating tongue functions 208, 210, 212, 214, 216 are provided by way of non-limiting example and are each discussed, in turn, below. Initially addressing the deployed/transport mode switching function (FUNCTION 208), the controller architecture 112 (FIG. 3) may selectively transition the articulating tongue arrangement 22 between deployed and transport modes of operation in embodiments of the present disclosure. When initially placed in the deployed mode, the controller architecture 112 controls the articulating tongue arrangement 22 to provide a first effective tow length suitable for utilizing a towed agricultural implement in its intended manner; that is, for utilizing the towed implement in the intended manner. The articulating tongue arrangement 22 may maintain the first effective tow length as the agricultural implement (e.g., the round baler 20) is utilized to perform a particular agriculture task; or, instead, the effective tow length of the tongue arrangement 22 may be actively varied during usage of the agricultural implement (e.g., the round baler 20) in response to operator input commands and/or to execute any number of the additional enhanced tongue articulation functions, as described herein. In embodiments, the first effective tow length may be a default tow length, which may be adjustable to operator preference or which may be automatically adjusted by the controller architecture 112 in response to the particular type of implement presently attached to the tractor 76 via the articulating tongue arrangement 22. In the latter regard, the controller architecture 112 may automatically determine the type of implement attached to the tractor 76 or may determine this from information entered into an onboard computer system by the tractor operator; utilize a look-up table or similar data structure stored in the memory 120 to determine an appropriate default tow length based upon the detected implement type; and then control the articulating tongue arrangement 22 to provide the determined tow length when initially placed in the deployed mode of operation.

Comparatively, when placed in the transport mode of operation, the controller architecture 112 controls the articulating tongue arrangement 22 (through the issuance of appropriate commands to the tongue arrangement 22 actuators) to provide a second effective tow length. The second effective tow length is less than the first effective tow length; and, in at least some embodiments, may be equivalent to a minimum effective tow length of the articulating beam assembly 88. Movement of the articulating tongue arrangement 22 into such a towed transport position, which brings the towed implement into relative close proximity of the tractor 76, is further indicated in FIG. 7. By switching between transport and deployed modes in this manner, embodiments of the articulating tongue arrangement 22 increase stability and maneuverability during non-use transport of the towed agricultural implement (e.g., the round baler 20), while also providing a greater (and customizable) effective tow length during in-field usage of a towed agricultural implement (e.g., the round baler 20). In at least some implementations, the controller architecture 112 may freeze (lock) at least one of the cylinders 106, 108, 110, or enable at least one of the cylinders 106, 108, 110 to float (passively stroke) in the transport mode to, for example, increase stability during roadway transport by reducing wobble of the towed implement relative to the tow vehicle.

Embodiments of the articulating tongue arrangement 22 may provide other enhanced tongue articulation functions in addition to or in lieu of the above-mentioned deployed/transport mode switching function (FUNCTION 208, FIG. 10). For example, a row following function (FUNCTION 210, FIG. 10) may be carried-out when the articulating tongue arrangement 22 is utilized in towing an agricultural implement that ingests crop material during usage when, for example, traveling over previously-created windrows. In this regard, embodiments of the articulating tongue arrangement 22 may be controlled by the controller architecture 112 to position a towed agricultural implement, such as the round baler 20, in a laterally offset, side-pull configuration during implement usage. Further, in implementations in which the articulating tongue arrangement 22 possesses a hinged beam design, the agricultural implement (e.g., the round baler 20) can be position fully to a selected side of the towed implement side by rotating the leading and trailing beams 172, 174 to form a predetermined side-pull angle ($\theta_{SP}$) about the intermediate pivoting joint 176 (FIG. 6). This angle ($\theta_{SP}$) may range from about 135° to about 90° in embodiments, while may be greater or lesser than the aforementioned range in other implementations. In this case, the ability of the articulating beam assembly 88 to swivel or pivot about the intermediate pivoting joint 176 (FIG. 6) enables full side positioning of an agricultural implement, while imparting the articulating tongue arrangement 22 with an increasingly compact design relative to existing fixed-length tongue assemblies. In the context of balers and other agricultural implements desirably centered over a windrow during forward travel, such positioning enables cameras or other forward-looking sensors onboard the agricultural implement (e.g., the round baler 20) with an improved view of the windrow largely or wholly unobstructed by the towed implement itself.

Row following functions can thus be carried-out during implement usage through visual analysis of the camera feed(s) and corresponding positional adjustments of the agricultural implement (e.g., the round baler 20) to maintain the implement in a centered position over a given windrow, whether by direct steering of the implement or by positional adjustments of the implement effectuated utilizing the articulating tongue arrangement 22. In either case, the necessity for swerving or other repeated, minor adjustments to the tractor heading are minimized, if not largely eliminated to improve operator convenience, while ensuring proper implement operation (e.g., proper bale formation in the case of the round baler 20) on a consistent basis. It is also noted, for completeness, that the controller architecture 112 may provide some degree of row following (and other forms of fore-aft movement of the towed implement) by manipulating the relative distance between the tow vehicle (e.g., the tractor 76) and the towed implement (e.g., the round baler 20) through minor swinging motions moving the implement toward or away from an axis colinear with to the tractor's direction of travel, while the articulating tongue arrangement 22 remains in a rigid state.

Addressing next the example bale positioning or placement function (FUNCTION 212, FIG. 10), this function can be performed in addition to or in lieu of any of the other auto-articulating tongue functions discussed throughout this document. When executing such a bale positioning function (FUNCTION 212, FIG. 10), the controller architecture 112 associated with the articulating tongue arrangement 22 may determine a particular orientation in which an ejected bale is desirably positioned and/or may identify a particular ground location at which a baler is desirably deposited (jointly referred to herein as "ejected bale placement"). The controller architecture 112 may assess ejected bale placement when the baler prepares to eject a newly-formed bale from its baling compartment; and then command the articulating tongue arrangement 22 to position the baler to achieve the desired ejected bale placement during bale ejection. For example, in at least some implementations, the controller architecture 112 may determine desired ground placement of an ejected square or round bale based upon the location of any sensed or otherwise known obstacles in the vicinity of the towed implement, to position the newly-ejected bale well within the path previously traveled by the towed implement, or based upon other criteria.

Bale orientation may be further considered in the context of round or cylinder bales, which may be ejected onto a hill (inclined surface) in a desired orientation to discourage downhill rolling. Thus, in rendering this determination, the controller architecture 112 may perform the steps or processes of: (i) establishing a desired (ground slope-referenced) bale orientation for a round bale when ejected from the round baler 20, and (ii) selecting the effective tow length target and the swing position target to position the round baler 20 to eject the round bale in the desired bale orientation. Further, the controller architecture 112 may establish the desired bale orientation based upon sensor input (e.g., input received from a MEMS gyroscope or tilt sensor) indicative of a local ground slope direction and magnitude, noting that such bale positioning to provide anti-roll function may only be performed if the local ground slope exceeds a minimum threshold value at which downhill rolling of round crop bales may become problematic.

The bale positioning function may be useful when the round baler 20 is utilized in hills and enables round bales to be ejected from the round baler 20 in an optimal orientation, while the tractor 76 (or other tow vehicle) traverses the inclines in an upward or downward (as opposed to lateral) direction. This may be appreciated by referring once again to FIG. 9, which shows a sequence of positions through which the baler 20 may be moved relative to the tractor 76 via appropriate posturing of the articulating tongue arrangement 22 when ejecting the round bale 54 to have a desired orientation (extend lengthwise in the direction of the downhill slope 190), while the tractor heading remains pointing in an uphill direction. Here, the round baler 20 is effectively moved into a jackknifed or L-shaped relationship with the tractor 76 with minimal tractor movement or operator guidance to ease operator workload. A reverse sequence of motions can then be performed to return the baler 20 to an inline tow position following bale ejection. Such a bale placement function can be performed automatically in response to detection of the baler 20 preparing to eject a round bale on a sufficient ground slope; or, instead, in response to operator selection of an option for optimal bale placement via the operator interface 116 located in the cabin of the tractor 76.

Discussing next the adaptive feedrate function (FUNCTION 214, FIG. 10), this function may be beneficially performed when the articulating tongue arrangement 22 is utilized in pulling a baler, a mower-conditioner, or another agricultural implement into which crop material is ingested. When executing the adaptive feedrate function, the controller architecture 112 associated with the articulating tongue system may monitor the effective tow length of the articulating tongue arrangement 22, which may be normally maintained at a default value; e.g., at a position providing approximately one half the maximum possible effective tow length between the leading and trailing pivoting joints of the articulating tongue arrangement 22. Stated differently, in embodiments wherein the articulable beam assembly 88 is movable between a first position in which the effective tow length has a maximum value ($V_{MAX}$) and a second position in which the effective tow length has a minimum value ($V_{MIN}$), neutral or default preset value may be selected to be substantially equivale to N, wherein $N=\frac{1}{2}(V_{MAX}-V_{MIN})$ During performance of the adaptive feedrate function (FUNCTION 214, FIG. 10), the controller architecture 112 may monitor current sensor data to determine when a temporary boost or temporary drop in a current feedrate of the towed agricultural implement is appropriate. When determining that a temporary feedrate boost is warranted, the controller architecture 112 may control the articulating tongue arrangement 22 to reduce the effective tow length (drawing the agricultural implement toward the towed implement) to temporarily boost the feedrate of the implement at a controlled rate. Similarly, when the current feedrate of the agricultural implement is desirably decreased, the controller architecture 112 may command the articulating tongue arrangement 22 to increase the effective tow length (allow the agricultural implement to move away from the towed implement) at a controlled rate to provide the desired decease in the feedrate of the towed implement. After performing a temporary feedrate adjustment, the controller architecture 112 may then control articulating tongue arrangement 22 to gradually return the current effective tow length to the preset (neutral) value, thereby providing sufficient spacing between (e.g., the tractor 76) and the agricultural implement (e.g., the round baler 20) for further iterations of the feedrate modification function or subprocess.

Figure 11:
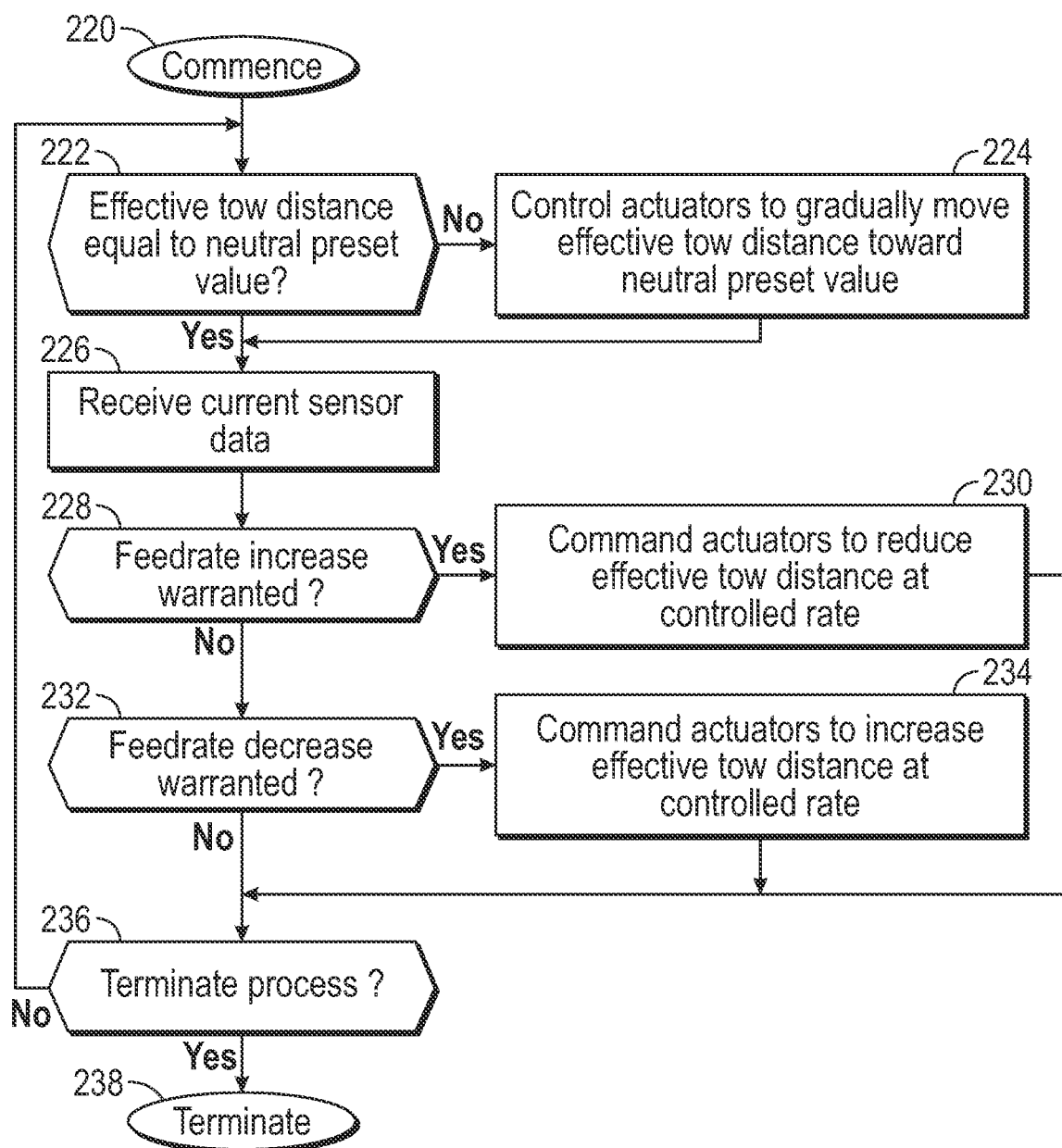
FIG. 11 is a flowchart illustrating an example subprocess for actively varying the feedrate of a towed agricultural implement (e.g., a baler) via positional control of the articulating tongue arrangement, which may be performed pursuant to the overarching process shown in FIG. 10 in embodiments of the present disclosure.

FIG. 11 is a flowchart illustrating an example subprocess 218 for actively varying the feedrate of a towed agricultural implement, such as the round baler 20, via positional control of the articulating tongue arrangement 22, which may be performed pursuant to the overarching master process 192 shown in FIG. 10 in embodiments of the present disclosure. After commencing the feedrate modification subprocess 218 (STEP 220), the controller architecture 112 progresses to STEP 222 determines whether the current effective tow distance of the articulating tongue arrangement 22 is substantially equivalent to a default or preset value set for the effective tow distance (arrow 111). The default value of the effective tow distance correspond to a neutral position in which the towed agricultural implement (the round baler 20) is desirably maintained relative to the tow vehicle (the tractor 76) absent the temporary feedrate modification through movement of the articulating tongue arrangement 22. In many cases, and as noted above, the default value of the effective tow distance will be approximately one half the maximum possible effective tow length between the leading and trailing pivoting joints of the articulating tongue arrangement 22. In this manner, the controller architecture 112 can readily decrease the effective tow distance (e.g., by moving the towed implement toward the tow vehicle) or increase the effective tow distance (e.g., by allowing the towed implement to move away from the tow vehicle) to vary the implement feedrate, as described below.

If determining that the effective tow distance is substantially equivalent to the default value during STEP 222, the controller architecture 112 moves to STEP 226. Otherwise, the controller architecture 112 progresses to STEP 224 and controls the articulating tongue arrangement 22 to gradually return the current effective tow distance to the default value before advancing to STEP 226. The controller architecture 112 may return the current effective tow distance to the default value in a gradual manner to avoid or minimize abrupt changes or variations in the feedrate of the towed implement. When the towed implement assumes the form of a round baler, such as the round baler 20, this may favorably reduce the degree to which abrupt changes in the forward motion of the tractor 76 are required to ensure consistent bale shaping. Accordingly, during STEP 224, the controller architecture 112 may determine the appropriate actuator commands to move the current effective tow distance of the articulating tongue arrangement 22 toward the default value in an incremental fashion; and, during each iteration of the subprocess 218, iteratively perform incrementally adjustments to the articulating tongue arrangement 22 until the current effect tow distance of the tongue arrangement 22 again equals the default value.

The default value defining the starting or baseline effective tow distance may be recalled by the controller architecture 112 from the computer-readable memory 120 of the articulating tongue system 22, 112 and, in certain implementations, may be adjustable to operator preference. So too may the controller architecture 112 vary the default value of the effective tow distance based upon towed implement type in certain instances utilizing a process similar to that previously discussed. In embodiments in which temporary increases in feedrate are particularly useful or likely, for example, or when the controller architecture 112 controls the articulating tongue system 22, 112 to provide only feedrate increases, the default value of the effective tow distance may be selected to be closer to, and perhaps equivalent to, a maximum possible value of the effective tow distance (e.g., as shown in FIG. 6). Conversely, in scenarios in which temporary decreases in feedrate are more helpful, for example, or when the controller architecture 112 controls the articulating tongue system 22, 112 to provide only feedrate decreases, the default value of the effective tow distance may be selected to be closer to a minimum possible value of the effective tow distance, providing that an adequate spacing is still provided between the towed implement and the tow vehicle to perform the agricultural task at hand.

Next, at STEP 226 of the articulating tongue feedrate modification subprocess 218, the controller architecture 112 gathers sensor data utilized to determine whether a feedrate increase or decrease of the towed agricultural implement (e.g., the round baler 20) is warranted. In embodiments, the controller architecture 112 may determine when such feedrate adjustments are warranted based upon sensor data indicative of a current load placed on the towed implement engine (when utilized to power the agricultural implement), sensor data indicative of local crop density or the density of the crop material currently processes by the towed implement (e.g., whether the round baler 20 is currently processing a "plug" of crop material), sensor data indicating a current stage or phase of operation of the towed implement, or other sensor data. In certain cases, an operator may be provided with an input control, such as physical or virtual button, to provide a temporary feedrate boost (or suppression), which can trigger the feedrate increase or decrease actions described below.

After gather the pertinent sensor data at STEP 226, the controller architecture 112 next determines whether a feedrate increase is warranted based upon the newly-collected sensor data (STEP 228). If determining that a feedrate increase is not warranted at STEP 228, the controller architecture 112 advances to STEP 232 and determines whether a feedrate decrease is instead warranted, as discussed below. Otherwise, the controller architecture 112 progresses to STEP 230 and commands the appropriate actuators (e.g., selected ones of the leading pivoting joint actuator 106, the trailing pivoting joint actuator 108, and the beam assembly actuator 110 to reduce the effective tow distance at a controlled rate to bring about an increase in the feedrate of the agricultural implement. The controller architecture 112 may control the articulating tongue arrangement 22 to reduce the effective tow distance at a fixed rate during STEP 230 in embodiments; or, instead, at a variable rate that increases in conjunction with an increasing urgency for the desired feedrate increase. The controller architecture 112 may determine that a feedrate increase is warranted to, for example, ensure that a minimum volume of crop material is typically processed by the towed agricultural implement; or, perhaps, to help provide a more consistent load on the work vehicle engine to improve engine efficiency. After effectuating the desired feedrate increase by commanding the articulating tongue arrangement 22 to reduce the effective tow distance, the controller architecture 112 advances to STEP 236 and determines whether the articulating tongue feedrate modification subprocess 218 should terminate or an additional iteration of the subprocess 218 should instead be performed.

At STEP 232, the controller architecture 112 establishes whether a feedrate decrease is appropriate based upon the sensor data collected during STEP 228 of the subprocess 281. If determining that such a feedrate decrease is warranted (e.g., due to an excessively high load placed on the work vehicle engine or due to a high crop density as cause when, for example, encountering a crop "plug"), the controller architecture 112 progresses to STEP 234 and commands the tongue arrangement actuators 106, 108, 110 to increase the effective tow distance at a controlled rate to bring about an increase in the feedrate of the agricultural implement. As was the case with decreases in the effective tow rate, the controller architecture 112 may control the articulating tongue arrangement 22 to increase the effective tow distance at a fixed rate or a variable rate during STEP 230. Afterwards, the controller architecture 112 advances to STEP 236 and determines whether the articulating tongue feedrate modification subprocess 218 should terminate or whether a further iteration of the subprocess 218 should instead be performed. If determining that the subprocess 218 should terminate, the controller architecture 112 progresses to STEP 238 and terminates the articulating tongue feedrate modification subprocess 218. Otherwise, the controller architecture 112 returns to STEP 222 and the above-described process steps repeat or loop; again noting that, through the performance of STEP 222 and the selective performance of STEP 224, the controller architecture 112 gradually returns or resets the effective tow length of the articulating tongue arrangement 22 to the neutral or default value after the above-described feedrate modifications to provide sufficient freedom of movement for future feedrate modifications through corresponding movements of the tongue arrangement 22. Finally, although not stated above, it will be appreciated that the controller architecture 112 may bypass either STEP 228 or STEP 232 if the effective tow length has reaches its minimum possible or maximum possible value, respectively.

Addressing lastly the bale formation and ejection assistance functionality (FUNCTION 216, FIG. 10), this functionality is beneficially carried-out when the articulating tongue arrangement 22 is utilized in towing a round baler, such as the round baler 20. In this case, the articulating tongue arrangement 22 may be controlled to vary the effective tow length, and thereby move the round baler in any one of a number of manners, to assist with bale formation within the round baler and/or ejection of the bale from the baler. In one possible approach, the tow vehicle may stop or slow as the round baler undergoes a final bale formation phase. Next, the controller architecture 112 controls the articulating tongue arrangement 22 to decrease the effective tow length at a first rate (e.g., by moving the round baler toward the tractor 76 or other towed implement) as the baler gathers a final volume of crop material into the baling compartment to complete rolling formation of the bale. As this step concludes (and, thus, as the baler moves into relative close proximity of the tow vehicle), the controller architecture 112 then controls the articulating tongue arrangement 22 to increase the effective tow length of the articulating beam assembly 88, again moving the baler away from the tow vehicle, as the round baler engages in a bale wrapping process. Following this, the controller architecture 112 then controls the articulating tongue arrangement 22 to decrease the effective tow length at a second rate (e.g., greater than the first rate), while the bale is ejected from the round baler. Movement of the baler in this manner urges displacement of the newly-formed round bale from the round baler due to the momentum of the bale itself. Lastly, to complete this multi-stage process, the controller architecture 112 may further command the articulating tongue arrangement 22 to return the effective tow length to its default or neutral value, thus allowing the bale formation process to begin anew.

Figure 12:
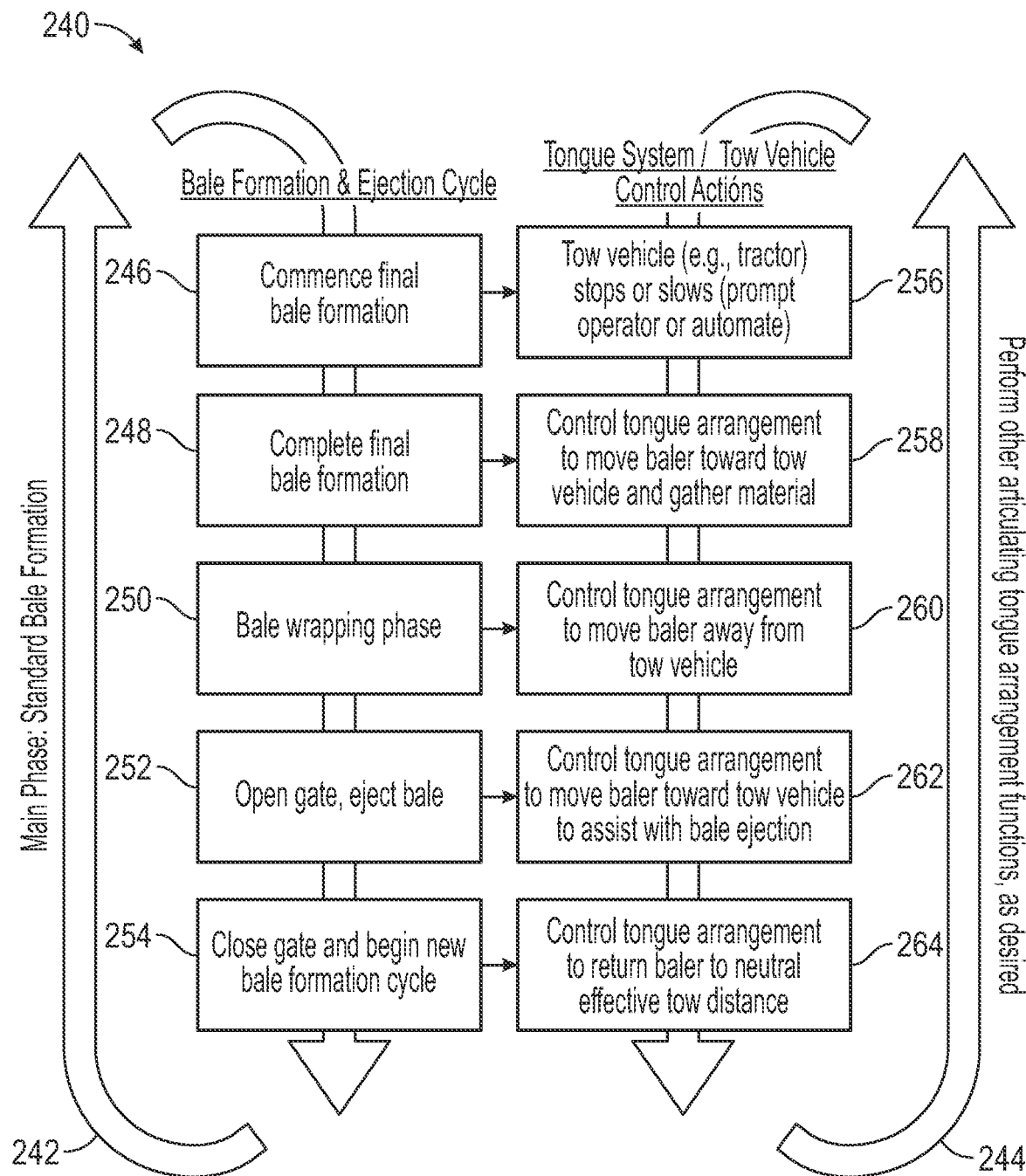
FIG. 12 is a flowchart illustrating an example subprocess for assisting in bale formation and ejection by a round baler through controlled movements of the articulating tongue arrangement, which may further be conducted pursuant to the overarching process shown in FIG. 10 in embodiments of the present disclosure.

FIG. 12 is a flowchart illustrating an example subprocess 240 for assisting in bale formation and ejection of a round baler utilizing the articulating tongue arrangement 22, which may or may not be performed as part of the overarching master process 192 shown in FIG. 10. The bale formation and ejection (BF/E) assistance subprocess 240 occurs in a cyclic manner (represented by symbol 244) including a number of STEPS 256, 258, 260, 262, 264. The steps of BF/E assistance subprocess 240 are synchronized or coordinated with a number of actions or events 246, 248, 250, 252, 254 occurring during a bale formation and ejection cycle (symbol 242) performed by a round baler, such as the round baler 20 shown in FIGS. 1, 2, and 6-9. Generally, the BF/E assistance subprocess 240 commences at STEP 256, which is synchronized with entry of the round baler 20 into a final bale formation stage (EVENT 246). The round baler 20 enters the final bale formation stage (EVENT 246) when a crop bale formed in the baling compartment 28 of the round baler 20 is near reaching its desired volume or diameter; e.g., in one embodiments, the round baler 20 may enter the final bale formation stage (EVENT 246) when a currently-formed bale reaches a predetermined percentage of a desired diameter, as determined by the controller architecture 112 based upon data provided by standard sensors onboard the round baler 20. At this juncture, the tow vehicle may be stopped or slowed (STEP 256). Stopping or slowing of the tow vehicle may be carried-out in an automated fashion by the controller architecture 112; or, instead, audible or visual prompts may be generated within the tow vehicle cabin urging an operator to perform this action.

Next, as the round baler 20 completes the final bale formation stage (EVENT 248), the controller architecture 112 controls the articulating tongue arrangement 22 to decrease the effective tow length at a first rate (e.g., by moving the round baler 20 in a forward direction toward the tractor 76) as the baler 20 gathers a final volume of crop material into the baling compartment 28 to complete rolling formation of the bale. As this step concludes (and, therefore, as the round baler 20 moves into relative close proximity of the tow vehicle), the round baler 20 enters a bale wrapping phase (EVENT 250). Concurrently, the controller architecture 112 commands the articulating tongue arrangement 22 to increase the effective tow length of the articulating beam assembly 88, again moving the baler 20 in a rearward direction away from the tow vehicle, as the round baler engages in a bale wrapping process (STEP 260). Stated differently, when the round baler 20 enters the bale wrapping phase (EVENT 250), the controller architecture 112 controls the articulating beam assembly 88 to move the round baler 20 in a rearward direction by a distance sufficient to accommodate subsequent forward movement of the round baler 20 during ejection of the round bale from the baling compartment, as described below. Afterwards, the round baler 20 opens its baler gate frame 70 (e.g., as shown in FIG. 2) to prepare for bale ejection (EVENT 252). When the gate frame 70 is fully opened, the controller architecture 112 controls the articulating tongue arrangement 22 to decrease the effective tow length at a second rate (e.g., greater than the first rate), moving the baler 20 in a forward direction toward the tractor 76, while the newly-formed round bale 54 is ejected from the round baler 20 (STEP 262).

Movement of the round baler 20 in the above-described manner thus urges displacement of the newly-formed round bale 54 from the round baler due to momentum acting on the bale as the round baler 20 is moved in a forward direction. Lastly, to complete the BF/E subprocess 240, the controller architecture 112 further command the articulating tongue arrangement 22 to return the effective tow length to its default or neutral value (STEP 262) as the baler 20 closes the gate frame 70 and begins a new iteration of the bale formation and ejection cycle (EVENT 254). Thus, through performance of the BF/E assistance subprocess 240, optimal bale formation and ejection can be achieved on a consistent with minimal operator input and tractor movement, thereby improving the performance of the round baler 20, while easing demands placed on the operator of the tractor 76. In alternative implementations, one or more of STEPS 256, 258, 260, 262, 264 may be omitted or modified in varying manners, providing that controller architecture 112 actively modifies the effective tow length of the articulating beam assembly 88 in a manner synchronized to at least a portion of the bale formation and ejection cycle performed by the round baler 20. For example, in further embodiments, the controller architecture 112 may control the articulating tongue arrangement 22 to pull the round baler 22 in a forward direction during the bale wrapping stage. Following this, during the bale ejection sequence, the controller architecture 112 controls the articulating tongue arrangement 22 to further push the round baler 20 in a rearward direction, while the baler gate is fully open or in the process of opening and the bale is ejected from the baler 20. This motion enables the bale to gather momentum and, upon ejection, to contact the ground with greater inertia and rolling momentum to clear the gate, thereby permitting the gate to close and the bale wrapping and ejection cycle to repeat. Broadly, then, various different bale ejection sequences or schemes can be envisioned in which the controller architecture 112 utilizes movements of the articulating tongue arrangement 22 to control bale speed and momentum to assist in bale ejection and gate clearing (e.g., by utilizing the tongue arrangement 22 to move the baler 20 in at least one predetermined direction) when ejecting a newly-formed bale from the round baler 20.

Enumerated Examples of Methods for Operating an Articulating Tongue Arrangement

The following examples of methods for operating an articulating tongue arrangement are further provided and numbered for ease of reference.

1. In a first example embodiment, a method is carried-out by a controller architecture coupled to a beam assembly actuator, which is included in an articulating tongue arrangement connecting an agricultural implement to a tow vehicle. The method includes the steps or processes of: (i) monitoring, via the controller architecture, an effective tow length of an articulating beam assembly further included in the articulating tongue arrangement, the effective tow length measured along a straight line extending from a leading pivot joint of the articulating tongue arrangement to a trailing pivot joint of the articulating tongue arrangement; (ii) determining, at the controller architecture, an effective tow length target of the articulating tongue arrangement based upon operator input, sensor input, or a combination thereof; and (iii) transmitting commands from the controller architecture to the beam assembly actuator to maintain the effective tow length of the articulating beam assembly in conformance with the effective tow length target.

2. The method of example 1, further including the steps or processes of: (i) repeatedly determining, via the controller architecture, a swing position target of the agricultural implement when in usage and towed behind the tow vehicle; and (ii) transmitting commands from the controller architecture to selected ones of the beam assembly actuator, a leading pivot joint actuator, and a trailing pivot joint actuator to maintain a current swing position of the agricultural implement in conformance with the swing position target. Further, the leading pivot joint actuator is controllable to adjust a pivot angle formed between a leading end portion of the articulating beam assembly and a vehicle attachment section of the articulating tongue arrangement, while the trailing pivot joint actuator is controllable to adjust a pivot angle formed between a trailing end portion of the articulating beam assembly and an implement attachment section of the articulating tongue arrangement.

3. The method of example 2, wherein the agricultural implement intakes crop material from windrows during usage of the agricultural implement. The method further includes, at the controller architecture, repeatedly adjusting the effective tow length target and the swing position target to maintain the agricultural implement in a windrow-centered position.

4. The method of example 2, wherein the agricultural implement assumes the form of a round baler. The method further includes the steps or processes of: (i) establishing, via the controller architecture, a desired bale orientation for a round bale when ejected from the round baler; and (ii) selecting, via the controller architecture, the effective tow length target and the swing position target to position the round baler to eject the round bale in the desired bale orientation.

5. The method of example 4, further including the steps or processes of: (i) receiving sensor input data at the controller architecture indicative of a local ground slope direction and magnitude, and (ii) establishing the desired bale orientation based, at least in part, on the local ground slope direction and magnitude, as indicated by the sensor input data.

6. The method of example 1, further including the steps or processes of: (i) identifying, via the controller architecture, when the articulating tongue arrangement is placed in a transport mode; and (ii) when the articulating tongue arrangement is placed in a transport mode, commanding the beam assembly actuator to move the articulating beam assembly into a position in which the effective tow length is less than half a maximum effective tow length of the articulating beam assembly.

7. The method of example 1, wherein the agricultural implement is configured to intake crop material at a variable feedrate. The method further includes the steps or processes of: (i) determining, via the controller architecture, when a temporary feedrate modification to the variable feedrate of the agricultural implement is warranted; and (ii) when determining that a temporary feedrate modification to the variable feedrate is warranted, transmitting commands from the controller architecture to the beam assembly actuator to adjust the effective tow length of the articulating beam assembly to provide the temporary feedrate modification.

8. The method of example 7, further including, following adjustment of the effective tow length of the articulating beam assembly to provide the temporary feedrate modification, transmitting additional commands from the controller architecture to the beam assembly actuator to gradually return the effective tow length of the articulating beam assembly to a neutral preset value.

9. The method of example 8, wherein the articulable beam assembly is movable between (i) a first position in which the effective tow length has a maximum value ($V_{MAX}$), and (ii) a second position in which the effective tow length has a minimum value ($V_{MIN}$). The method further includes selecting the neutral preset value to be substantially equivale to N, wherein $N=\frac{1}{2} (V_{MAX}-V_{MIN})$.

10. The method of example 1, wherein the agricultural implement assumes the form of a round baler having a baling compartment. The method further includes the steps or processes of: (i) determining when the round baler is preparing to eject a round bale from the baling compartment; and (ii) when determining that the round baler is preparing to eject a round bale, controlling the articulating beam assembly to move the round baler in a predetermined (e.g., forward) direction to urge ejection of the round bale from the baling compartment.

11. The method of example 10, further including the steps or processes of: (i) receiving sensor input data at the controller architecture indicative of a local ground slope direction and magnitude; and (ii) adjusting, via the controller architecture, a rate at which the articulating beam assembly moves the round baler in the predetermined direction during bale ejection based, at least in part, on the local ground slope direction and magnitude relative to a current orientation of the round baler.

12. The method of example 1, wherein the agricultural implement assumes the form of a round baler having a baling compartment. The method further includes the steps or processes of: (i) determining when the round baler is completing formation of a bale within the baling compartment; and (ii) when determining that the round baler is completing formation of a bale, controlling the articulating beam assembly to move the round baler in a forward direction to gather crop material into the round baler, while a speed of the tow vehicle decreases.

13. The method of example 12, further including the steps or processes of: (i) determining when the round baler enters a bale wrapping phase in which the round baler wraps a fully-formed bale within the baling compartment; and (ii) when determining that the round baler enters the bale wrapping phase, controlling the articulating beam assembly to move the round baler in a rearward direction.

14. In further embodiments, a method is carried-out by a controller architecture coupled to a beam assembly actuator included in an articulating tongue arrangement connecting a tow vehicle to a round baler having a baling compartment. The method includes the steps or processes of: (i) monitoring when the round baler is preparing to eject a round bale from the baling compartment; and (ii) when the round baler is preparing to eject a round bale, controlling the articulating tongue arrangement to move the round baler in a predetermined direction (e.g., a forward direction, a direction rearward, or a direction angled to the rear and to a side of the tow vehicle) and urge ejection of the round bale from the baling compartment. The step of controlling further includes the sub-steps or subprocesses of: (ii)(a) determining, via the controller architecture, commands for transmission to the beam assembly actuator to adjust an effective tow length of an articulating beam assembly further included in the articulating tongue arrangement; and (ii)(b) transmitting the commands from the controller architecture to the beam assembly actuator to adjust the effective tow length of the articulating beam assembly and move the round baler in the predetermined direction in conjunction with ejection of the round bale from the baling compartment.

15. The method of example 14, further including the steps or processes of: (i) further monitoring when the round baler is completing formation of the round bale within the baling compartment; and (ii) when the round baler is completing formation of the round bale, further controlling the articulating beam assembly to move the round baler in a forward direction to gather crop material into the round baler, while a speed of the tow vehicle decreases.

CONCLUSION

There has thus been provided embodiments of an articulating tongue arrangement beneficially utilized in towing an agricultural implement behind a tractor or other tow vehicle. The articulating tongue arrangement includes, among other structural features, an articulating beam assembly having an adjustable effective tow length measured along a straight line extending between leading and trailing pivoting joints of the tongue arrangement. Through adjustments in the effective tow length of the articulating beam assembly, as implemented via commands transmitted from a controller architecture to one or more tongue arrangement actuators, operators gain increased control (movement flexibility) over posturing of the articulating tongue arrangement and, therefore, movement of a towed agricultural implement relative to the tow vehicle. Still further improvements in the maneuverability of the tongue arrangement may further be achieved in implementations in which the articulating beam assembly includes a central or intermediate pivoting joint; e.g., as may be the case when the articulating tongue arrangement is realized utilizing a hinged beam design (open chain, 2-bar linkage) including leading and trailing beams, which are pivotally joined at the intermediate pivoting joint. Regardless of the particular construction of the articulating beam assembly, embodiments of the articulating tongue arrangement enable movement in one or more additional DOFs (lacking in conventional tongue arrangements) to enhance the maneuverability and other functional aspects of the tongue arrangement.

Embodiments of an articulating tongue system have also been provided, which include a controller architecture, which is operably coupled to one or more tongue arrangement actuators contained in the articulating tongue arrangement. Further, in various implementations, the controller architecture is configured to perform one or more auto-articulating tongue functions utilizing the articulating tongue arrangement. For example, embodiments of the articulating tongue system may be operable to switch the articulating tongue arrangement between a deployed mode in which the controller architecture controls an articulating beam assembly to initially provide a first effective tow length; and a transport mode in which the controller architecture controls the articulating beam assembly to provide a second effective tow length less than the first effective tow length. Additionally or alternatively, embodiments of the articulating tongue system may be operably in a row following mode in which the articulating tongue arrangement is controlled to better maintain a towed agricultural implement in a desired (e.g., centered) position over windrows during implement usage. Further, when utilized in towing an agricultural implement into which crop material is ingested, such as a baler or a mower-conditioner, the articulating tongue system may be operable in an adaptive feedrate mode. When placed in the adaptive feedrate mode, the controller architecture may determine when temporary adjustments in the feedrate of the towed implement are warranted; and, when so determining, control the articulating tongue arrangement to bring about such feedrate adjustments through variations in the effective tow length of the tongue arrangement. In still further implementations in which the articulating tongue system is utilized in conjunction with a baler, such as round baler, the controller architecture may control the articulating tongue arrangement to position the baler for optimal placement of ejected crop bales and/or to assist in the formation and ejection of crop bales by synchronizing certain movements of the tongue arrangement with the baling actions performed by the baler, as previously described.

As used herein, the singular forms "a", "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A method carried-out by a controller architecture coupled to a beam assembly actuator included in an articulating tongue arrangement connecting an agricultural implement to a tow vehicle via an attachment interface, the method comprising:
   monitoring, via the controller architecture, an effective tow length of an articulating beam assembly further included in the articulating tongue arrangement, the articulating beam assembly being pivotally coupled to the attachment interface and having a leading beam joined to a trailing beam by a pivoting joint, the effective tow length measured along a straight line extending from a leading pivot joint of the articulating tongue arrangement to a trailing pivot joint of the articulating tongue arrangement;
   determining, at the controller architecture, an effective tow length target of the articulating tongue arrangement based upon operator input, sensor input, or a combination thereof; and
   transmitting commands from the controller architecture to the beam assembly actuator to maintain the effective tow length of the articulating beam assembly in conformance with the effective tow length target.

2. The method of claim 1, wherein the agricultural implement is configured to intake crop material at a variable feedrate; and
   wherein the method further comprises:
   determining, via the controller architecture, when a temporary feedrate modification to the variable feedrate of the agricultural implement is warranted; and when determining that a temporary feedrate modification to the variable feedrate is warranted, transmitting commands from the controller architecture to the beam assembly actuator to adjust the effective tow length of the articulating beam assembly to provide the temporary feedrate modification.

3. The method of claim 2, further comprising, following adjustment of the effective tow length of the articulating beam assembly to provide the temporary feedrate modification, transmitting additional commands from the controller architecture to the beam assembly actuator to gradually return the effective tow length of the articulating beam assembly to a neutral preset value.

4. The method of claim 3, wherein the articulable beam assembly is movable between (i) a first position in which the effective tow length has a maximum value ($V_{MAX}$), and (ii) a second position in which the effective tow length has a minimum value ($V_{MIN}$); and
wherein the method further comprises selecting the neutral preset value to be substantially equivale to N, wherein N=½ ($V_{MAX}$-$V_{MIN}$).

5. The method of claim 1, wherein the agricultural implement comprises a round baler having a baling compartment; and
wherein the method further comprises:
determining when the round baler is preparing to eject a round bale from the baling compartment; and
when determining that the round baler is preparing to eject a round bale, controlling the articulating beam assembly to move the round baler in a predetermined direction to urge ejection of the round bale from the baling compartment.

6. The method of claim 5, further comprising:
receiving sensor input data at the controller architecture indicative of a local ground slope direction and magnitude; and
adjusting, via the controller architecture, a rate at which the articulating beam assembly moves the round baler in the predetermined direction during bale ejection based, at least in part, on the local ground slope direction and magnitude relative to a current orientation of the round baler.

7. The method of claim 1, wherein the agricultural implement comprises a round baler having a baling compartment; and
wherein the method further comprises:
determining when the round baler is completing formation of a bale within the baling compartment; and
when determining that the round baler is completing formation of a bale, controlling the articulating beam assembly to move the round baler in a forward direction to gather crop material into the round baler, while a speed of the tow vehicle decreases.

8. The method of claim 7, further comprising:
determining when the round baler enters a bale wrapping phase in which the round baler wraps a fully-formed bale within the baling compartment; and
when determining that the round baler enters the bale wrapping phase, controlling the articulating beam assembly to move the round baler in a rearward direction.

9. A method carried-out by a controller architecture coupled to a beam assembly actuator included in an articulating tongue arrangement connecting an agricultural implement to a tow vehicle, the method comprising:
monitoring, via the controller architecture, an effective tow length of an articulating beam assembly further included in the articulating tongue arrangement, the effective tow length measured along a straight line extending from a leading pivot joint of the articulating tongue arrangement to a trailing pivot joint of the articulating tonque arrangement;
determining, at the controller architecture, an effective tow length target of the articulating tongue arrangement based upon operator input, sensor input, or a combination thereof;
transmitting commands from the controller architecture to the beam assembly actuator to maintain the effective tow length of the articulating beam assembly in conformance with the effective tow length target;
repeatedly determining, via the controller architecture, a swing position target of the agricultural implement when in usage and towed behind the tow vehicle; and
transmitting commands from the controller architecture to selected ones of the beam assembly actuator, a leading pivot joint actuator, and a trailing pivot joint actuator to maintain a current swing position of the agricultural implement in conformance with the swing position target;
wherein the leading pivot joint actuator is controllable to adjust a pivot angle formed between a leading end portion of the articulating beam assembly and a vehicle attachment section of the articulating tongue arrangement; and
wherein the trailing pivot joint actuator is controllable to adjust a pivot angle formed between a trailing end portion of the articulating beam assembly and an implement attachment section of the articulating tongue arrangement.

10. The method of claim 9, wherein the agricultural implement intakes crop material from windrows during usage of the agricultural implement; and
wherein the method further comprises, at the controller architecture, repeatedly adjusting the effective tow length target and the swing position target to maintain the agricultural implement in a windrow-centered position.

11. The method of claim 9, wherein the agricultural implement comprises a round baler; and
wherein the method further comprises:
establishing, via the controller architecture, a desired bale orientation for a round bale when ejected from the round baler; and
selecting, via the controller architecture, the effective tow length target and the swing position target to position the round baler to eject the round bale in the desired bale orientation.

12. The method of claim 11, further comprising:
receiving sensor input data at the controller architecture indicative of a local ground slope direction and magnitude; and
establishing the desired bale orientation based, at least in part, on the local ground slope direction and magnitude, as indicated by the sensor input data.

13. The method of claim 1, further comprising: A method carried-out by a controller architecture coupled to a beam assembly actuator included in an articulating tongue arrangement connecting an agricultural implement to a tow vehicle, the method comprising:
monitoring, via the controller architecture, an effective tow length of an articulating beam assembly further included in the articulating tonque arrangement, the effective tow length measured along a straight line extending from a leading pivot joint of the articulating tongue arrangement to a trailing pivot joint of the articulating tongue arrangement;

determining, at the controller architecture, an effective tow length target of the articulating tongue arrangement based upon operator input, sensor input, or a combination thereof;

transmitting commands from the controller architecture to the beam assembly actuator to maintain the effective tow length of the articulating beam assembly in conformance with the effective tow length target;

identifying, via the controller architecture, when the articulating tongue arrangement is placed in a transport mode; and when the articulating tongue arrangement is placed in a transport mode, commanding the beam assembly actuator to move the articulating beam assembly into a position in which the effective tow length is less than half a maximum effective tow length of the articulating beam assembly.

14. A method carried-out by a controller architecture coupled to a beam assembly actuator included in an articulating tongue arrangement connecting a tow vehicle to a round baler having a baling compartment, the method comprising:

monitoring when the round baler is preparing to eject a round bale from the baling compartment; and when the round baler is preparing to eject a round bale, controlling the articulating tongue arrangement to move the round baler in a predetermined direction and urge ejection of the round bale from the baling compartment;

wherein controlling comprises:

determining, via the controller architecture, commands for transmission to the beam assembly actuator to adjust an effective tow length of an articulating beam assembly further included in the articulating tongue arrangement; and transmitting the commands from the controller architecture to the beam assembly actuator to adjust the effective tow length of the articulating beam assembly and move the round baler in the predetermined direction in conjunction with ejection of the round bale from the baling compartment.

15. The method of claim 14, further comprising:

further monitoring when the round baler is completing formation of the round bale within the baling compartment; and when the round baler is completing formation of the round bale, further controlling the articulating beam assembly to move the round baler in a forward direction to gather crop material into the round baler, while a speed of the tow vehicle decreases.

16. The method of claim 15, further comprising:

further monitoring when the round baler enters a bale wrapping phase in which the round baler wraps a fully-formed bale within the baling compartment; and when the round baler enters the bale wrapping phase, controlling the articulating beam assembly to move the round baler in a rearward direction by a distance sufficient to accommodate forward movement of the round baler during ejection of the round bale from the baling compartment.

17. The method of claim 14, further comprising:

receiving sensor input data at the controller architecture indicative of a local ground slope direction and magnitude; and adjusting, via the controller architecture, a rate at which the articulating beam assembly moves the round baler in the forward direction during bale ejection based, at least in part, on the local ground slope direction and magnitude relative to a current orientation of the round baler.

18. A method carried-out by a controller architecture coupled to a beam assembly actuator included in an articulating tongue arrangement connecting an agricultural implement to a tow vehicle, the articulating tongue arrangement further including an articulating beam assembly having an effective tow length adjustable utilizing the beam assembly actuator, the method comprising:

monitoring, at the controller architecture, a variable feedrate at which the agricultural implement intakes crop material when towed behind the tow vehicle;

determining, via the controller architecture, when a temporary feedrate modification to the variable feedrate of the agricultural implement is warranted; and when determining that a temporary feedrate modification to the variable feedrate is warranted, transmitting commands from the controller architecture to the beam assembly actuator to adjust the effective tow length of the articulating beam assembly to provide the temporary feedrate modification.

19. The method of claim 18, wherein determining comprises determining, via the controller architecture, when a temporary feedrate increase is warranted;

when determining that a temporary feedrate increase is warranted, transmitting commands from the controller architecture to the beam assembly actuator to decrease the effective tow length of the articulating beam assembly to provide the temporary feedrate increase; and after providing the temporary feedrate increase, further commanding the beam assembly actuator to gradually increase the effective tow length of the articulating beam assembly to return the effective tow length to a neutral preset value.

20. The method of claim 19, wherein determining comprises determining, via the controller architecture, when a temporary feedrate decrease is warranted;

when determining that a temporary feedrate decrease is warranted, transmitting commands from the controller architecture to the beam assembly actuator to increase the effective tow length of the articulating beam assembly to provide the temporary feedrate decrease; and after providing the temporary feedrate decrease, further commanding the beam assembly actuator to gradually decrease the effective tow length of the articulating beam assembly to return the effective tow length to a neutral preset value.

* * * * *